(12) United States Patent
Sohn et al.

(10) Patent No.: US 10,679,618 B2
(45) Date of Patent: Jun. 9, 2020

(54) ELECTRONIC DEVICE AND CONTROLLING METHOD THEREOF

(71) Applicant: SAMSUNG ELECTRONICS CO., LTD., Suwon-si (KR)

(72) Inventors: Young-chul Sohn, Seoul (KR); Gyu-tae Park, Seoul (KR); Ki-beom Lee, Seoul (KR); Jong-ryul Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 70 days.

(21) Appl. No.: 15/803,051

(22) Filed: Nov. 3, 2017

(65) Prior Publication Data
US 2018/0122379 A1 May 3, 2018

(30) Foreign Application Priority Data

Nov. 3, 2016 (KR) .......... 10-2016-0145742
Aug. 22, 2017 (KR) .......... 10-2017-0106127

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G10L 15/18* (2013.01); *G10L 17/22* (2013.01);
(Continued)

(58) Field of Classification Search
CPC .......... G06F 3/167; G06F 3/01; G06F 3/0481; G06F 17/2765; G06F 17/28;
(Continued)

(56) References Cited

U.S. PATENT DOCUMENTS 5,550,970 A   8/1996   Cline et al.
6,175,772 B1 * 1/2001  Kamiya ............... G06N 3/008
                                               700/31
(Continued)

FOREIGN PATENT DOCUMENTS

JP   2002-55874 A    2/2002
JP   2009-211494 A   9/2009
(Continued)

OTHER PUBLICATIONS

International Search Report dated Feb. 2, 2018 issued by PCT Office in corresponding International Patent Application No. PCT/KR2017/012271.
(Continued)

*Primary Examiner* — Abdelali Serrou
(74) *Attorney, Agent, or Firm* — Sughrue Mion, PLLC

(57) ABSTRACT

An approach for controlling method of an electronic device is provided. The approach acquires voice information and image information for setting an action to be executed according to a condition, the voice information and the image information being respectively generated from a voice and a behavior associated with the voice of a user. The approach determines an event to be detected according to the condition and a function to be executed according to the action when the event is detected, based on the acquired voice information and the acquired image information. The approach determines at least one detection resource to detect the determined event. In response to the at least one determined detection resource detecting at least one event satisfying the condition, the approach executes the function according to the action.

20 Claims, 24 Drawing Sheets

(51) Int. Cl.

| | | |
|---|---|---|
| *G10L 15/18* | (2013.01) | |
| *H04N 21/422* | (2011.01) | |
| *G10L 17/22* | (2013.01) | |
| *H04L 12/28* | (2006.01) | |
| *H04N 21/439* | (2011.01) | |
| *H04N 21/44* | (2011.01) | |
| *H04N 21/41* | (2011.01) | |
| *H04N 21/4223* | (2011.01) | |
| *G10L 15/08* | (2006.01) | |

(52) U.S. Cl.
CPC ......... *H04L 12/28* (2013.01); *H04N 21/4131* (2013.01); *H04N 21/4223* (2013.01); *H04N 21/42203* (2013.01); *H04N 21/4394* (2013.01); *H04N 21/44008* (2013.01); *G10L 2015/088* (2013.01); *G10L 2015/223* (2013.01)

(58) Field of Classification Search
CPC ........... G06F 2203/04101; G06F 3/048; G06F 3/0482; G06F 3/04847; G06F 3/0488; G06F 3/16; G06F 3/16; G06K 2009/00738; G06K 9/00268; G06K 9/00281; G06K 9/00751; G10L 15/00; G10L 15/183; G10L 15/26; G10L 15/22; G10L 2015/088; G10L 2015/223; G10L 15/18; G10L 17/22; G10L 25/63; H04N 21/23418; H04N 21/4131; H04N 21/4223; H04N 21/43615; H04N 21/4753; H04N 21/44008; H04N 21/42203

See application file for complete search history.

(56) References Cited

U.S. PATENT DOCUMENTS

| | | | | |
|---|---|---|---|---|
| 6,570,555 | B1* | 5/2003 | Prevost | G06F 3/01 345/156 |
| 6,967,455 | B2 | 11/2005 | Nakadai et al. | |
| 8,661,120 | B2 | 2/2014 | Atchison et al. | |
| 8,788,257 | B1* | 7/2014 | Su | G06F 40/20 704/2 |
| 9,398,335 | B2* | 7/2016 | Hough | H04N 21/454 |
| 2003/0147624 | A1* | 8/2003 | Trajkovic | H04N 7/163 386/326 |
| 2003/0189674 | A1* | 10/2003 | Inoue | H04N 5/45 348/738 |
| 2005/0210061 | A1 | 9/2005 | Chang et al. | |
| 2006/0252457 | A1 | 11/2006 | Schrager | |
| 2007/0038332 | A1* | 2/2007 | Ozaki | G05B 15/02 700/245 |
| 2007/0271595 | A1* | 11/2007 | Jin | H04L 29/12547 726/3 |
| 2009/0175510 | A1* | 7/2009 | Grim, III | G06F 16/5862 382/118 |
| 2009/0307718 | A1* | 12/2009 | Tong | H04N 7/163 725/28 |
| 2010/0037300 | A1* | 2/2010 | Jin | G06F 9/542 726/4 |
| 2010/0217981 | A1* | 8/2010 | Jin | H04L 63/04 713/168 |
| 2011/0026737 | A1* | 2/2011 | Park | G06F 3/165 381/104 |
| 2011/0109539 | A1* | 5/2011 | Wu | G06F 3/011 345/156 |
| 2011/0119346 | A1* | 5/2011 | Kim | H04L 12/2814 709/217 |
| 2011/0141307 | A1* | 6/2011 | Seto | H04N 5/232 348/222.1 |
| 2012/0151327 | A1* | 6/2012 | Jin | H04L 12/00 715/234 |
| 2012/0163677 | A1 | 6/2012 | Thorn | |
| 2012/0198099 | A1* | 8/2012 | Kwon | G06F 13/102 710/8 |
| 2013/0010207 | A1 | 1/2013 | Valik et al. | |
| 2013/0141572 | A1* | 6/2013 | Torres | H04N 7/185 348/143 |
| 2013/0147629 | A1* | 6/2013 | Kim | G08B 5/00 340/691.6 |
| 2013/0321256 | A1* | 12/2013 | Kim | H04N 21/42203 345/156 |
| 2014/0163976 | A1 | 6/2014 | Park et al. | |
| 2014/0229727 | A1* | 8/2014 | Jun | G06F 9/4418 713/2 |
| 2014/0289683 | A1* | 9/2014 | Park | G06F 3/0488 715/863 |
| 2014/0300684 | A1 | 10/2014 | Fagadar-Cosma et al. | |
| 2015/0019710 | A1 | 1/2015 | Shaashua et al. | |
| 2015/0169336 | A1 | 6/2015 | Harper et al. | |
| 2015/0309809 | A1* | 10/2015 | Shin | G06F 9/54 718/100 |
| 2015/0319614 | A1* | 11/2015 | Cho | H04L 9/3247 726/7 |
| 2015/0339059 | A1 | 11/2015 | Kang et al. | |
| 2016/0217369 | A1 | 7/2016 | Annapureddy et al. | |
| 2016/0358070 | A1 | 12/2016 | Brothers et al. | |
| 2018/0046894 | A1 | 2/2018 | Yao | |
| 2018/0122379 | A1 | 5/2018 | Sohn et al. | |

FOREIGN PATENT DOCUMENTS

| | | |
|---|---|---|
| JP | 2009-230831 A | 10/2009 |
| KR | 2003-0013732 A | 2/2003 |
| KR | 10-0969447 B1 | 7/2010 |
| KR | 10-2014-0039961 A | 4/2014 |
| KR | 10-2015-0136811 A | 12/2015 |
| KR | 10-2016-0143548 A | 12/2016 |
| KR | 10-2018-0049787 A | 5/2018 |
| WO | 2008/069519 A1 | 6/2008 |
| WO | 2010/129056 A2 | 11/2010 |
| WO | 2015/088141 A1 | 6/2015 |

OTHER PUBLICATIONS

Written Opinion of the International Searching Authority dated Feb. 2, 2018 issued by PCT Office in corresponding International Patent Application No. PCT/KR2017/012271.

"KAIST, Development of Deep Running Artificial Intelligence Semiconductors for Mobile Devices", Ministry of Science and ICT, Feb. 26, 2018, pp. 1-19, 21 pages total.

Communication dated Oct. 4, 2019, issued by the European Patent Office in counterpart European Application No. 17866553.5.

Search Report dated Oct. 29, 2019, issued by the International Searching Authority in International Application No. PCT/KR2019/008872 (PCT/ISA/210).

Written Opinion dated Oct. 29, 2019, issued by the International Searching Authority in International Application No. PCT/KR2019/008872 (PCT/ISA/237).

\* cited by examiner

ELECTRONIC DEVICE AND CONTROLLING METHOD THEREOF

CROSS-REFERENCE TO RELATED APPLICATIONS

This application claims priority from Korean Patent Application No. 10-2016-0145742, filed in the Korean Intellectual Property Office on Nov. 3, 2016, and from Korean Patent Application No. 10-2017-0106127, filed in the Korean Intellectual Property Office on Aug. 22, 2017, the disclosures of which are incorporated herein by reference in their entirety.

BACKGROUND OF THE INVENTION

1. Field

Recent advances in semiconductor technology and wireless communication technology have enabled communication with various objects, allowing users to control things conveniently.

In addition, the present disclosure pertains to artificial intelligence (AI) system which simulates functions such as recognition and determination of human brain by using machine learning algorithm and application thereof.

2. Description of the Related Art

The Internet of Things (IOT) refers to a network of things that include communication functions, and the use of the Internet is gradually increasing. In this case, a device that operates in the IOT environment may be referred to as an IOT device.

The IOT device can detect the surrounding situation. In recent years, the IOT device is used to recognize the surrounding situation, and accordingly, there is a growing interest in a context aware service that provides information to users.

For example, in the context recognition service, if a situation satisfying the user's condition is recognized through the IOT device based on the condition set by the user, a specific function according to the condition can be executed.

Typically, when a user sets a condition, the user is required to set a detailed item for a condition and a detailed item for a function to be executed according to the function one by one.

For example, when setting a condition in which a drawer is opened, the user had to install a sensor in the drawer, register the installed sensor using an application, and input detailed conditions for detecting opening of the drawer using the installed sensor.

Recently, artificial intelligence systems that implement human-level intelligence have been used in various fields. An artificial intelligence system is a system that the machine learns, judges and becomes smarter itself, unlike the existing rule-based smart system. Artificial intelligence systems show better recognition ability and improved perception of user preferences and thus, existing rule-based smart systems are increasingly being replaced by deep-learning-based artificial intelligence systems.

Artificial intelligence technology consists of machine learning (e.g., deep learning) and element technologies that utilize machine learning.

Machine learning is an algorithm technology that classifies/learns the characteristics of input data by itself. Element technology is technology that simulates functions such as recognition and determination of the human brain using a machine learning algorithm such as deep learning. The element technology consists of linguistic understanding, visual understanding, reasoning/prediction, knowledge representation, motion control, etc.

Various fields in which artificial intelligence technology is applied are as follows.

Linguistic understanding is a technology for recognizing, applying, and processing human language/characters, including natural language processing, machine translation, dialog system, query/response, speech recognition/synthesis, and the like.

Inference prediction is technology to determine information, logically infers, and includes knowledge/probability-based prediction, prediction of optimization, preference-based plan, and recommendation.

Visual understanding is a technology for recognizing and processing objects as human vision, including object recognition, object tracking, image search, human recognition, scene understanding, spatial understanding, and image enhancement.

Inference prediction is a technique for judging and logically inferring and predicting information, including knowledge/probability based reasoning, optimization prediction, preference base planning, recommendation, and the like.

Knowledge representation is technology for automating human experience information into knowledge data, including knowledge building (data generation/classification) and knowledge management (data utilization).

Motion control is technology for controlling the autonomous travel of the vehicle and the motion of the robot, and includes motion control (navigation, collision, traveling), operation control (behavior control).

SUMMARY

It is an object of the present disclosure to provide a method for a user to easily and quickly set an action to be executed according to a condition, and to execute an action according to the condition when a set condition is satisfied.

In an exemplary embodiment, a controlling method of an electronic device may include acquiring voice information and image information generated from a natural language uttered by a user and an action of the user associated with the natural language for setting an action to be executed according to a condition, determining an event to be detected according to the condition and a function to be executed according to the action when the event is detected based on the acquired voice information and image information, determining at least one detection source to detect the determined event, and in response to at least one event satisfying the condition being detected using the at least one determined detection source, controlling to execute a function according to the action.

According to another exemplary embodiment, an electronic device includes a memory, and a processor configured to acquire voice information and image information generated from a natural language uttered by a user and an action of the user associated with the natural language for setting an action to be executed according to an action, to determine an event to be detected according to the condition and a function to be executed according to the action based on the voice information and image information, to determine at least one detection resource to detect the event, and in response to at least one event satisfying the condition being detected using the at least one determined detection resource, to control to execute the function according to the action.

According to yet another exemplary embodiment, a computer-readable non-transitory recording medium may include a program which allows an electronic device to perform an operation of acquiring voice information and image information generated from a natural language uttered by a user and an action of the user associated with the natural language for setting an action to be executed according an action, an operation of determining an event to be detected according to the condition and a function to be executed according to the action based on the acquired voice information and image information, an operation of determining at least one detection resource to detect the determined event, and an operation of, in response to at least one event satisfying the condition being detected using the at least one determined detection resource, controlling to execute the function according to the action.

In some exemplary embodiments, a controlling method of an electronic device includes: acquiring voice information and image information setting an action to be executed according to a condition, the voice information and image information being generated from a voice and a behavior; determining an event to be detected according to the condition and a function to be executed according to the action, based on the voice information and the image information; determining at least one detection resource to detect the event; and in response to the detection resource detecting one event satisfying the condition, executing the function according to the action.

In some other exemplary embodiments, an electronic device includes: a memory; and a processor configured to respectively acquire voice information and image information setting an action to be executed according to a condition, the voice information and image information being generated from a voice and a behavior, to determine an event to be detected according to the condition and a function to be executed according to the action, based on the voice information and the image information, to determine at least one detection resource to detect the event, and in response to the at least one determined detection resource detecting at event satisfying the condition executing the function according to the action.

According to the various exemplary embodiments of the present disclosure described above, a natural language uttered by a user and an action to be executed according to the action based on a behavior of the user may be set.

In addition, a device to detect an event according to a condition and a device to execute a function according to an action may be automatically determined.

Thereby, the satisfaction of the user using a situation recognition service can be greatly improved.

In addition, the effects obtainable or predicted by the exemplary embodiments of the present disclosure will be directly or implicitly described in the detailed description of the exemplary embodiments of the present disclosure. For example, various effects to be expected in accordance with the exemplary embodiments of the present disclosure will be set forth within the following detailed description.

BRIEF DESCRIPTION OF THE DRAWINGS

The above and other aspects of one or more exemplary embodiments will become more apparent by reference to specific exemplary embodiments thereof which are illustrated in the appended drawings. Understanding that these drawings depict only exemplary embodiments of the disclosure and are not therefore to be considered to be limiting of the scope of the disclosure, the principles herein are described and explained with additional specificity and detail through the use of the accompanying drawings, in which.

DETAILED DESCRIPTION

Figure 1A:
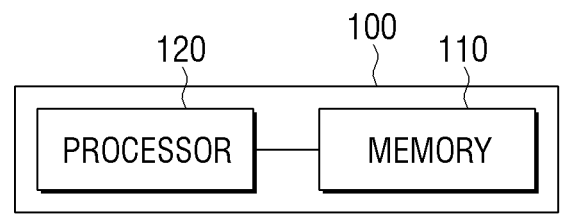
FIGS. 1A to 1C are block diagrams showing a configuration of an electronic device, according to an exemplary embodiment of the present disclosure.

Hereinafter, various exemplary embodiments of the present disclosure will be described with reference to the accompanying drawings. It should be understood that the exemplary embodiments and terminology used herein are not intended to limit the invention to the particular exemplary embodiments described, but to include various modifications, equivalents, and/or alternatives of the exemplary embodiment. In relation to explanation of the drawings, similar drawing reference numerals may be used for similar constituent elements. Unless otherwise defined specifically, a singular expression may encompass a plural expression. In this disclosure, expressions such as "A or B" or "at least one of A and/or B" and the like may include all possible combinations of the items listed together. Expressions such as "first" or "second," and the like, may express their components irrespective of their order or importance and may be used to distinguish one component from another, but is not limited to these components. When it is mentioned that some (e.g., first) component is "(functionally or communicatively) connected" or "accessed" to another "(second) component", the component may be directly connected to the other component or may be connected through another component (e.g., a third component).

In this disclosure, "configured to (or set to)" as used herein may, for example, be used interchangeably with "suitable for", "having the ability to", "altered to", "adapted to", "capable of" or "designed to" in hardware or software. Under certain circumstances, the term "device configured to" may refer to "device capable of" doing something together with another device or components.

For example, "a processor configured (or set) to perform A, B, and C" may refer to an exclusive processor (e.g., an embedded processor) for performing the corresponding operations, or a general-purpose processor (e.g., a CPU or an application processor) capable of performing the corresponding operations by executing one or more software programs stored in a memory device.

Electronic devices in accordance with various exemplary embodiments of the present disclosure may include at least one of, for example, smart phones, tablet PCs, mobile phones, videophones, electronic book readers, desktop PCs, laptop PCs, netbook computers, workstations, a portable multimedia player (PMP), an MP3 player, a medical device, a camera, and a wearable device. A wearable device may include at least one of an accessory type (e.g., a watch, a ring, a bracelet, a bracelet, a necklace, a pair of glasses, a contact lens, or a head-mounted-device (HMD)), a textile or garment-integrated type (e.g., electronic clothes), a body attachment-type (e.g., skin pads or tattoos), and an implantable circuit.

In some exemplary embodiments, the electronic device may, for example, include at least one of a television, a digital video disk (DVD) player, an audio player, a refrigerator, an air conditioner, a vacuum cleaner, an oven, a microwave oven, a washing machine, and may include at least one of a panel, a security control panel, a media box (e.g., Samsung HomeSync®, Apple TV®, or Google TV™), a game console (e.g., Xbox®, PlayStation®), electronic dictionary, electronic key, camcorder, and an electronic frame.

In another exemplary embodiment, the electronic device may include at least one of any of a variety of medical devices (e.g., various portable medical measurement devices such as a blood glucose meter, a heart rate meter, a blood pressure meter, or a body temperature meter), magnetic resonance angiography (MRA), magnetic resonance imaging (MRI), computed tomography (CT), camera, or ultrasonic, etc.), a navigation system, a global navigation satellite system (GNSS), an event data recorder (EDR), a flight data recorder (FDR), an automobile infotainment device, a marine electronic equipment (for example, marine navigation devices, gyro compass, etc.), avionics, security devices, head units for vehicles, industrial or domestic robots, drone, ATMs at financial institutions, point of sales (POS), or an IOT devices (e.g., a light bulb, various sensors, a sprinkler device, a fire alarm, a thermostat, a streetlight, a toaster, a fitness appliance, a hot water tank, a heater, a boiler, etc.). According to some exemplary embodiments, the electronic device may include at least one of a piece of furniture, a building/structure, a part of an automobile, an electronic board, an electronic signature receiving device, a projector, gas, and various measuring instruments (e.g., water, electricity, gas, or radio wave measuring instruments, etc.). In various exemplary embodiments, the electronic device may be flexible or a combination of two or more of the various devices described above. The electronic device according to an exemplary embodiment is not limited to the above-mentioned devices. In the present disclosure, the term "user" may refer to a person using an electronic device or a device using an electronic device (e.g., an artificial intelligence electronic device).

Figure 1B:
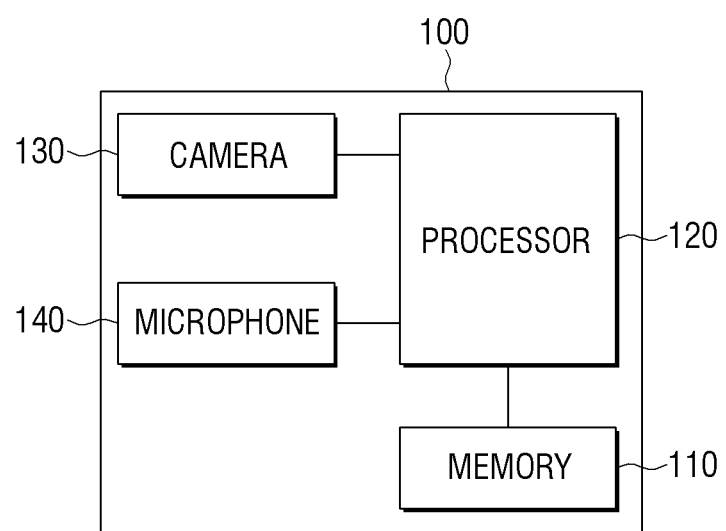
Figure 1C:
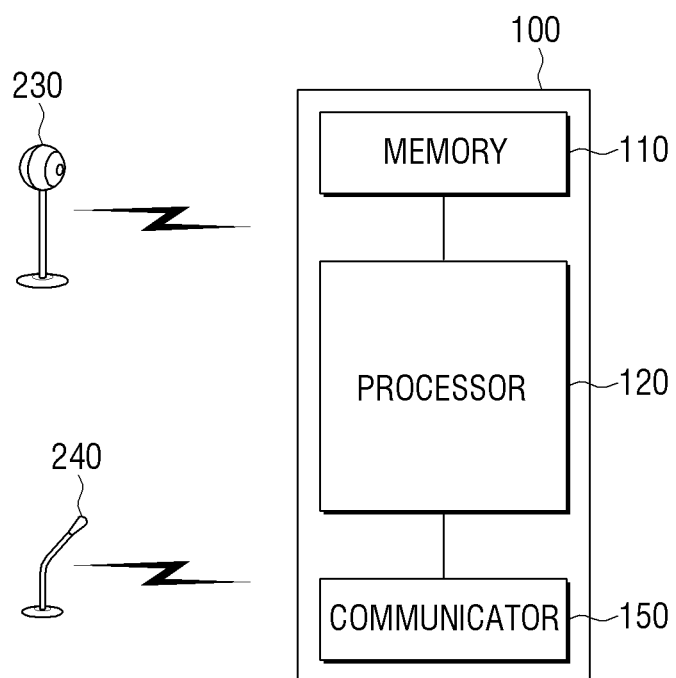

FIGS. 1A to 1C are block diagrams showing a configuration of an electronic device, according to an exemplary embodiment of the present disclosure.

The electronic device 100 of FIG. 1A may be, for example, the above-described electronic device or a server. When the electronic device 100 is a server, the electronic device 100 may include, for example, a cloud server or a plurality of distributed servers.

The electronic device 100 of FIG. 1A may include a memory 110 and a processor 120.

The memory 110, for example, may store a command or data regarding at least one of the other elements of the electronic device 100. According to an exemplary embodiment, the memory 110 may store software and/or a program. The program may include, for example, at least one of a kernel, a middleware, an application programming interface (API) and/or an application program (or "application"). At least a portion of the kernel, middleware, or API may be referred to as an operating system. The kernel may, for example, control or manage system resources used to execute operations or functions implemented in other programs. In addition, the kernel may provide an interface to control or manage the system resources by accessing individual elements of the electronic device 100 in the middleware, the API, or the application program.

The middleware, for example, can act as an intermediary for an API or an application program to communicate with the kernel and exchange data. In addition, the middleware may process one or more job requests received from the application program based on priorities. For example, the middleware may prioritize at least one of the application programs to use the system resources of the electronic device 100, and may process the one or more job requests. An API is an interface for an application to control the functions provided in the kernel or middleware and may include, for example, at least one interface or function (e.g., command) for file control, window control, image processing, or character control.

Further, the memory 130 may include at least one of an internal memory and an external memory. The internal memory may include at least one of, for example, a volatile memory (e.g., a DRAM, an SRAM, or an SDRAM), a nonvolatile memory (e.g., an OTPROM, a PROM, an EPROM, an EEPROM, a mask ROM, a flash ROM, a flash memory, a hard drive, and a solid state drive (SSD)). The external memory may include a flash drive, for example, a compact flash (CF), a secure digital (SD), a micro-SD, a mini-SD, an extreme digital (XD), a multi-media card (MMC), a memory stick, or the like. The external memory may be functionally or physically connected to the electronic device 100 via various interfaces.

According to various exemplary embodiments, the memory 110 may acquire voice information and image information generated from a natural language in which the user speaks and the behavior of the user in association with the natural language, for the processor 120 to set an action to perform according to a condition, based on the acquired voice information and the image information, to determine an event to be detected according to the condition and a function to be executed according to the action when the event is detected, to determine at least one detection resource to detect the event, and in response to at least one event satisfying the condition being detected using the determined detection resource, to store a program to control the electronic device 100 to execute a function according to the condition.

The processor 120 may include one or more of a central processing unit (CPU), an application processor (AP), and a communication processor (CP).

The processor 120 may also be implemented as at least one of an application specific integrated circuit (ASIC), an embedded processor, a microprocessor, hardware control logic, a hardware finite state machine (FSM), a digital signal processor (DSP), and the like. Although not shown, the processor 120 may further include an interface, such as a bus, for communicating with each of the configurations.

The processor 120 may control a plurality of hardware or software components connected to the processor 120, for example, by driving an operating system or an application program, and may perform various data processing and operations. The processor 120, for example, may be realized as a system on chip (SoC). According to an exemplary embodiment, the processor 120 may further include a graphic processing unit (GPU) and/or an image signal processor. The processor 120 may load and process commands or data received from at least one of the other components (e.g., non-volatile memory) into volatile memory and store the resulting data in non-volatile memory.

According to various exemplary embodiments, the processor 120 may acquire audio information and image information generated from a natural language uttered by the user and user's actions (e.g. a user's behavior) associated with the natural language, for setting an action to be performed according to a condition. The processor 120 may determine an event to be detected according to the condition and a function to be executed according to the action when the event is detected, based on the acquired voice information and the image information. The processor 120 may determine at least one detection resource to detect the event. When at least one event satisfying the condition is detected using the determined detection resource, the processor 120 may control the electronic device 100 so that a function according to the condition is executed.

According to various exemplary embodiments, the processor 120 may determine an event to be detected according to the condition and a function to be executed according to the action, based on a data recognition model generated using a learning algorithm. The processor 120 may also use the data recognition model to determine at least one detection resource to detect the event. This will be described later in more detail with reference to FIGS. 10 to 13.

According to various exemplary embodiments, when determining at least one detection resource, the processor 120 may search for available resources that are already installed. The processor 120 may determine at least one detection resource from among the available resources to detect the event, based on the functions detectable by the retrieved available resources. In an exemplary embodiment, the detection resource may be a module included in the electronic device 100 or an external device located outside the electronic device 100.

According to various exemplary embodiments, the electronic device 100 may further include a communicator (not shown) that performs communication with the detection resource. An example of the communicator will be described in more detail with reference to the communicator 150 of FIG. 1C, and a duplicate description will be omitted. In an exemplary embodiment, the processor 120 may, when at least one detection resource is determined, control the communicator (not shown) such that control information requesting detection of an event is transmitted to the at least one determined resource.

According to various exemplary embodiments, the processor 120 may search for available resources that are already installed. The processor 120 may determine at least one execution resource to execute the function according to the action among the available resources based on the functions that the retrieved available resources can provide.

According to various exemplary embodiments, the electronic device 100 may further include a communicator (not shown) that communicates with the execution resource. An example of the communicator will be described in more detail with reference to the communicator 150 of FIG. 1C, and a duplicate description will be omitted. In an exemplary embodiment, when the processor 120 controls a function according to the action to be executed, the processor 120 may transmit the control information to the execution resource so that the determined execution resource executes the function according to the action.

According to various exemplary embodiments, the electronic device 100 may further include a display (not shown) for displaying a user interface (UI).

The display may include, for example, a liquid crystal display (LCD), a light emitting diode (LED) display, an organic light emitting diode (OLED) display, a microelectromechanical system (MEMS) display, or an electronic paper display. The display may include a touch screen, and may receive the inputs of touch, gesture, proximity, or hovering, using, for example, an electronic pen or a user's body part. In an exemplary embodiment, the processor 120 can control the display to display a notification UI informing that execution of the action according to the condition is impossible, if there is no detection resource to detect the event or if the detection resource cannot detect the event.

According to various exemplary embodiments, the processor 120 may determine an event to be detected according to a condition and a function to be executed according to the action when the event is detected, based on the acquired voice information and image information. The processor 120 applies the acquired voice information and image information to a data recognition model generated using a learning algorithm to determine the condition and the action according to the user's intention, and to determine an event to be detected according to a condition and a function to be executed according to the action.

According to various exemplary embodiments, when the electronic device 100 further includes a display, the processor 120 may, when determining a condition and an action according to the user's intention, control the display to display a confirmation UI for confirming conditions and actions to the user.

FIG. 1B is a block diagram showing a configuration of an electronic device 100, according to another exemplary embodiment of the present disclosure.

The electronic device 100 may include a memory 110, a processor 120, a camera 130, and a microphone 140.

The processor 120 of FIG. 1B may include all or part of the processor 120 shown in FIG. 1A. In addition, the memory 110 of FIG. 1B may include all or part of the memory 110 shown in FIG. 1A.

The camera 130 may capture a still image and a moving image. For example, the camera 130 may include one or more image sensors (e.g., front sensor or rear sensor), a lens, an image signal processor (ISP), or a flash (e.g., LED or xenon lamp).

According to various exemplary embodiments, the camera 130 may capture image of the behavior of the user to set an action according to the condition, and generate image information. The generated image information may be transmitted to the processor 120.

The microphone 140 may receive external acoustic signals and generate electrical voice information. The microphone 140 may use various noise reduction algorithms for eliminating noise generated in receiving an external sound signal.

According to various exemplary embodiments, the microphone 140 may receive the user's natural language to set the action according to the condition and generate voice information. The generated voice information may be transmitted to the processor 120.

According to various exemplary embodiments, the processor 120 may acquire image information via the camera 130 and acquire voice information via the microphone 140. In addition, the processor 120 may determine an event to be detected according to a condition and a function to be executed according to the action when the event is detected, based on the acquired image information and voice information. The processor 120 may determine at least one detection resource to detect the determined event. In response to the at least one determined detection resource detecting at least one event satisfying the condition, the processor 120 may execute a function according to the condition.

In an exemplary embodiment, the detection resource is a resource capable of detecting an event according to a condition among available resources, and may be a separate device external to the electronic device 100 or one module provided in the electronic device 100. In an exemplary embodiment, the module includes units composed of hardware, software, or firmware, and may be used interchangeably with terms such as, for example, logic, logic blocks, components, or circuits. A "module" may be an integrally constructed component or a minimum unit or part thereof that performs one or more functions.

In some exemplary embodiments, if the detection resource is a separate device external to the electronic device 100, the detection resources may be, for example, IOT devices and may also be at least some of the exemplary embodiments of the electronic device 100 described above. Detailed examples of detection resources according to events to be detected will be described in detail later in various exemplary embodiments.

FIG. 1C is a block diagram illustrating the configuration of an electronic device 100 and external devices 230 and 240, according to an exemplary embodiment of the present disclosure.

The electronic device 100 may include a memory 110, a processor 120, and a communicator 150.

The processor 120 of FIG. 1C may include all or part of the processor 120 shown in FIG. 1A. In addition, the memory 110 of FIG. 1C may include all or part of the memory 110 shown in FIG. 1A.

The communicator 150 establishes communication between the external devices 230 and 240, and may be connected to the network through wireless communication or wired communication so as to be communicatively connected with the external device. In an exemplary embodiment, the communicator 150 may communicate with the external devices 230 and 240 through a third device (e.g., a repeater, a hub, an access point, a server, or a gateway).

The wireless communication may include, for example, LTE, LTE Advance (LTE-A), Code division multiple access (CDMA), Wideband CDMA (WCDMA), universal mobile telecommunications system (UMTS), Wireless Broadband (WiBro), Global System for Mobile Communications (GSM), and the like. According to an exemplary embodiment, the wireless communication may include, for example, at least one of wireless fidelity (WiFi), Bluetooth, Bluetooth low power (BLE), ZigBee, near field communication, Magnetic Secure Transmission, Radio Frequency (RF), and body area network (BAN). The wired communication may include, for example, at least one of a universal serial bus (USB), a high definition multimedia interface (HDMI), a recommended standard 232 (RS-232), a power line communication, and a plain old telephone service (POTS).

The network over which the wireless or wired communication is performed may include at least one of a telecommunications network, a computer network (e.g., a LAN or WAN), the Internet, and a telephone network.

According to various exemplary embodiments, the camera 230 may capture image or video of the behavior of the user to set an action according to the condition, and generate image information. The communicator (not shown) of the camera 230 may transmit the generated image information to the communicator 150 of the electronic device 100. In an exemplary embodiment, the microphone 240 may receive the natural language (e.g., a phrase) uttered by the user to generate the voice information in order to set an action according to the condition. The communicator (not shown) of the microphone 240 may transmit the generated voice information to the communicator 150 of the electronic device 100.

The processor 120 may acquire image information and voice information through the communicator 150. In an exemplary embodiment, the processor 120 may determine an event to be detected according to a condition and determine a function to be executed according to the action when the event is detected, based on the acquired image information and voice information. The processor 120 may determine at least one detection resource to detect an event. In response to at least one event satisfying the condition being detected using the determination resource, the processor 120 may execute a function according to the condition.

Figure 2:
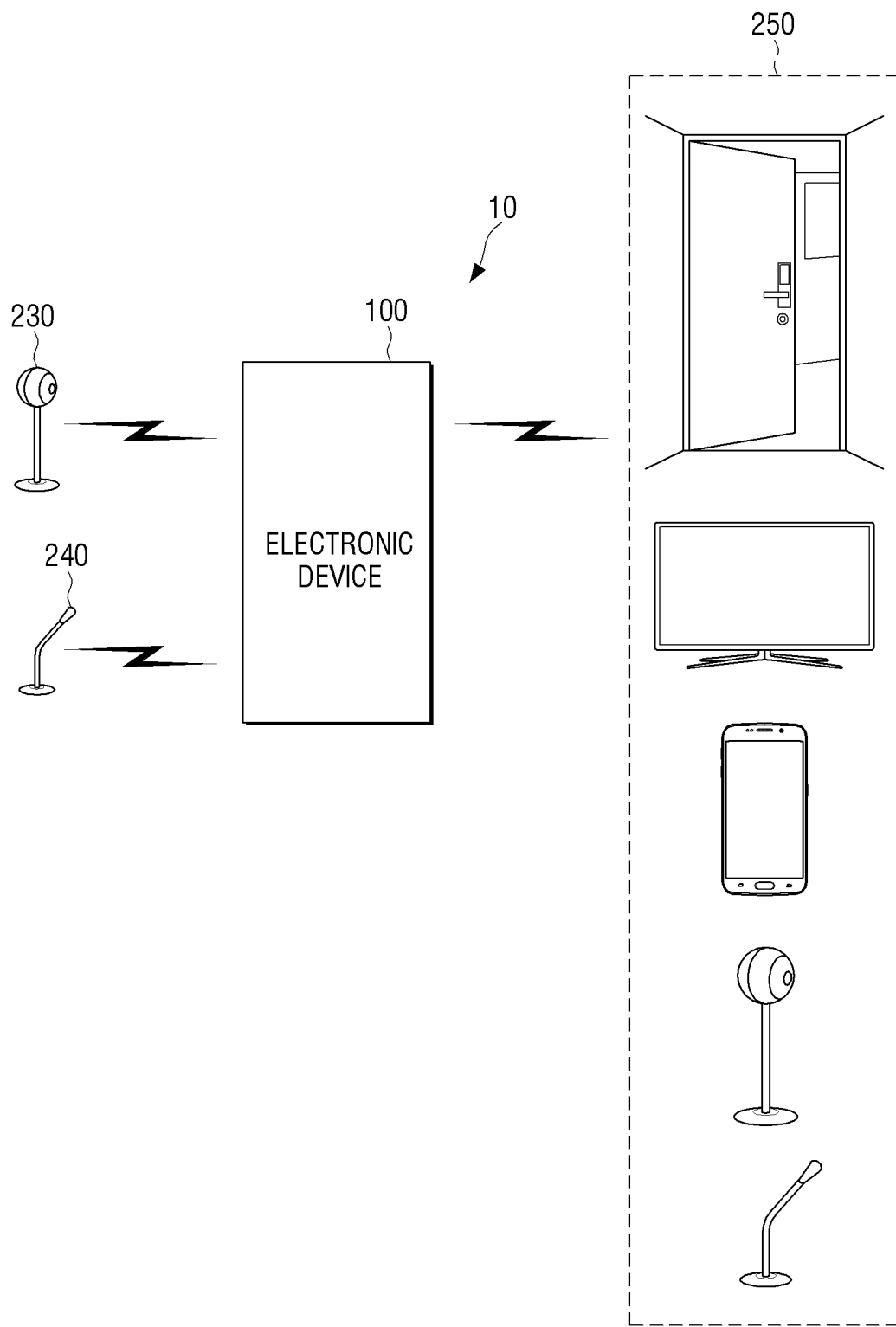
FIG. 2 is a block diagram showing a configuration of a system including an electronic device, according to an exemplary embodiment of the present disclosure.

FIG. 2 is a block diagram showing a configuration of a system 10 including an electronic device 100, according to an exemplary embodiment of the present disclosure.

The system 10 may include an electronic device 100, external devices 230, 240, and available resources 250.

The electronic device 100, for example, may include all or part of the electronic device 100 illustrated in FIGS. 1A to 1C. In addition, the external devices 230 and 240 may be the camera 230 and the microphone 240 of FIG. 1C.

The available resources 250 of FIG. 2 may be resource candidates that are able to detect conditions set by the user and perform actions according to the conditions.

In an exemplary embodiment, the detection resource is a resource that detects a condition-based event among the available resources 250, and the execution resource may be a resource capable of executing a function according to an action among the available resources 250.

The available resources 250 may be primarily IOT devices and may also be at least some of the exemplary embodiments of the electronic device 100 described above.

According to various exemplary embodiments, the camera 230 may capture image or video of the behavior of the user to set an action according to the condition, and generate image information. The camera 230 may transmit the generated image information to the electronic device 100. In addition, the microphone 240 may receive the natural language or voice uttered by the user to generate the voice information in order to set an action according to the condition. The microphone 240 may transmit the generated voice information to the electronic device 100.

The electronic device 100 may acquire image information from the camera 230 and acquire voice information from the microphone 240. In an exemplary embodiment, the electronic device 100 may determine an event to be detected according to a condition and determine a function to be executed according to the action when the event is detected, based on the acquired image information and voice information.

The electronic device 100 may search the available installed resources 250 and determine at least one detection resource, among the available resources 250, to detect conditional events using the detection capabilities (i.e., a detection function) of the at least one detection resource. The electronic device 100 may also search for available installed resources 250 and determine at least one execution resource, among the available resources 250, to perform a function according to the action based on the capabilities (i.e., an execution function) that the execution resource can provide.

When at least one event satisfying the condition is detected using the determined detection resource, the electronic device 100 may control the selected execution resource to execute the function according to the condition.

FIGS. 3A to 3D are diagrams illustrating a situation in which an action according to a condition is executed in the electronic device 100, according to an exemplary embodiment of the present disclosure.

In an exemplary embodiment, the user 1 may perform a specific action while speaking in a natural language in order to set an action to be executed according to a condition. The condition may be referred to as a trigger condition in that it fulfills the role of a trigger in which an action is performed.

For example, the user 1 performs a gesture instructing the drawer 330 with his or her fingers, or performs a glance toward the drawer, while saying "Record an image when another person opens the drawer over there."

In this example, the condition may be a situation where another person opens the drawer 330 indicated by the user 1, and the action may be a image recording of a situation in which another person opens the drawer 330.

Peripheral devices 310 and 320 located in the periphery of the user 1 may generate audio information and image information from natural language uttered by the user 1 and an action of the user 1 associated with the natural language. For example, the microphone 320 may receive a natural word "record an image when another person opens the drawer over there" to generate audio information, and the camera 310 may photograph or record an action of instructing the drawer 330 with a finger to generate image information.

Figure 3A:
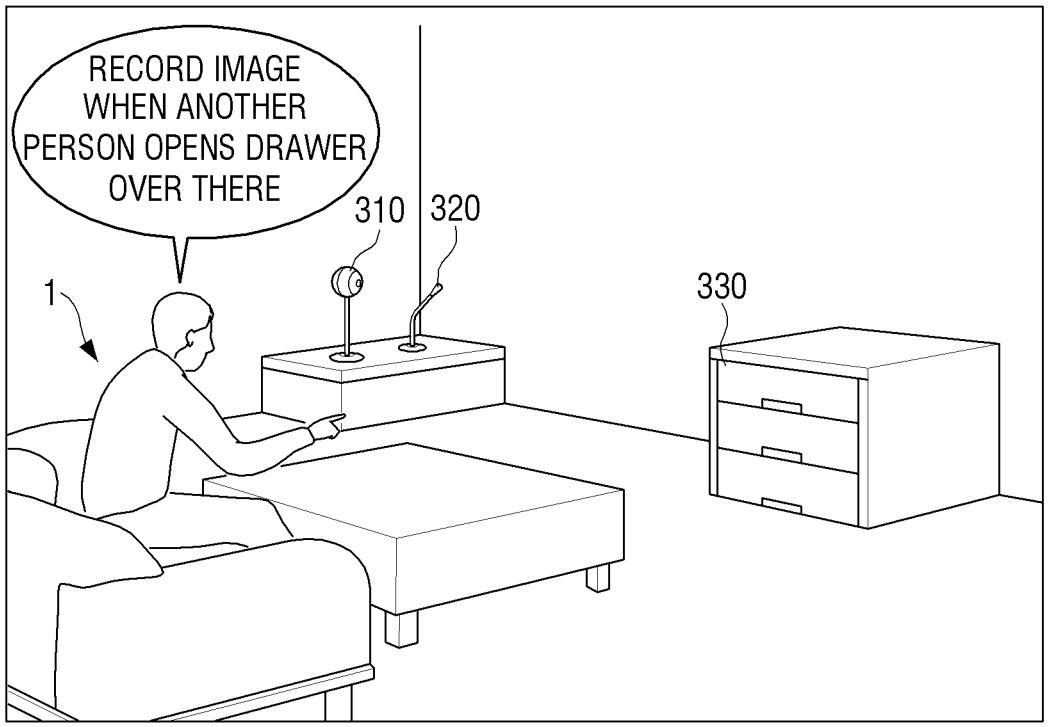
FIGS. 3A to 5D are diagrams showing a situation in which an action according to a condition is executed in an electronic device; according to an exemplary embodiment of the present disclosure.
Figure 3B:
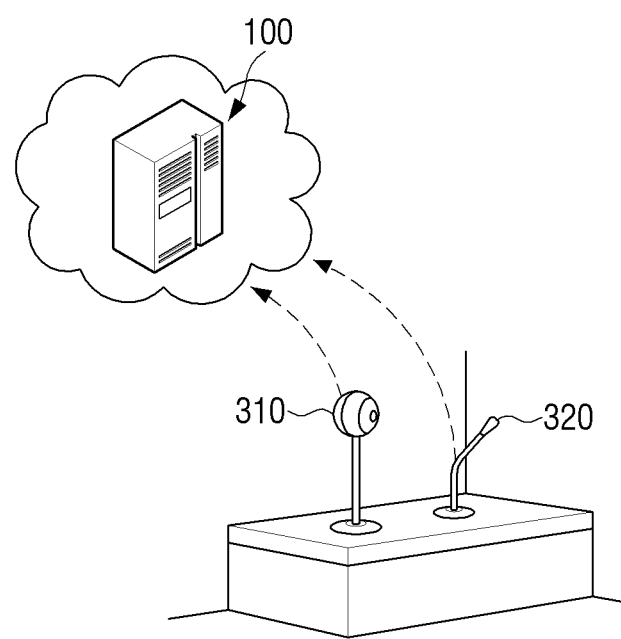

In an exemplary embodiment, the peripheral devices 310 and 320 can transmit the generated voice information and image information to the electronic device 100, as shown in FIG. 3B.

In an exemplary embodiment, the peripheral devices 310 and 320 may transmit the information to the electronic device 100 via a wired or wireless network. In another exemplary embodiment, in the case where the peripheral devices 310 and 320 are part of the electronic device 100 as shown in FIG. 1B, the peripheral devices 310 and 320 may transmit the information to the processor 100 of the electronic device 100 via an interface, such as a data communication line or bus.

In an exemplary embodiment, the processor 120 of the electronic device 100 may acquire voice information from a natural language through the communicator 150 and acquire image information from a user's action associated with the natural language. In another exemplary embodiment, when the peripheral devices 310 and 320 are part of the electronic device 100 as shown in FIG. 1C, the processor 120 may acquire audio information and image information generated from the user's action through an interface such as a bus.

The processor 120 may determine at least one event to be detected according to the condition and determine, when at least one event is detected, a function to be executed according to the action, based on the acquired voice information and image information.

For example, the processor 120 may determine an event in which the drawer 330 is opened and an event in which another person is recognized as at least one event to detect conditionally. The processor 120 may determine the function of recording an image of a situation in which another person opens the drawer 330 as a function to perform according to an action.

The processor 120 may select at least one detection resource for detecting at least one event among the available resources.

In this example, the at least one detection resource may include, for example, a camera 310 located in the vicinity of the drawer, capable of detecting both an event in which drawers are opened and an event of recognizing another person, and an image recognition module (not shown) for analyzing the photographed or recorded image and recognizing an operation or a state of an object included in the image. In an exemplary embodiment, the image recognition module may be part of the camera 310 or part of the electronic device 100. The image recognition module is described as part of the camera in this disclosure, but the image recognition module may be implemented as part of the electronic device 100 as understood by one of ordinary skill in the art. The camera may provide the image information to the electronic device 100 in a similar manner as the camera 310 providing the image information to the electronic device 100 in FIG. 3C.

In another exemplary embodiment, the at least one detection resource may include, for example, a distance detection sensor 340 for detecting an open event of the drawer 330 and a fingerprint recognition sensor 350 or iris recognition sensor for detecting an event that recognizes another person.

In an exemplary embodiment, the processor 120 may determine at least one execution resource for executing a function according to an action among the available resources.

For example, the at least one execution resource may be a camera located around the drawer 330 performing the function of recording. The camera may perform similar functions as the camera 310 providing the image information in FIG. 3C and FIG. 3D. Alternatively, the camera may be the same camera as the camera that detects the event.

Figure 3C:
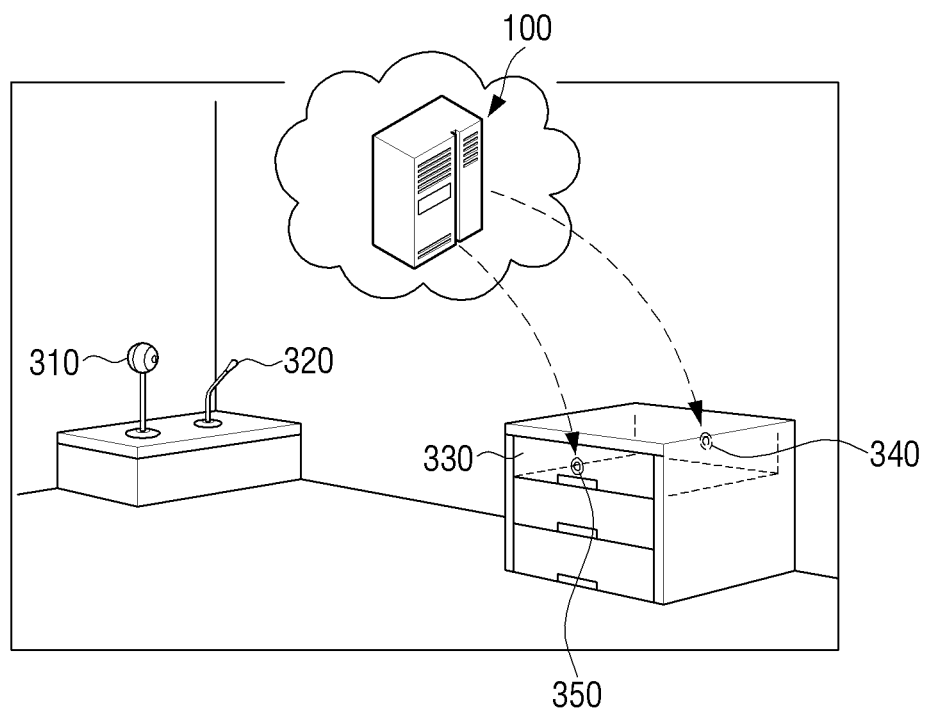

If at least one detection resource is selected, the processor 120 may transmit control information requesting detection of the event according to the condition to the selected detection resources 340 and 350, as shown in FIG. 3C.

The detection resource receiving the control information may monitor whether or not an event according to the condition is detected.

Figure 3D:
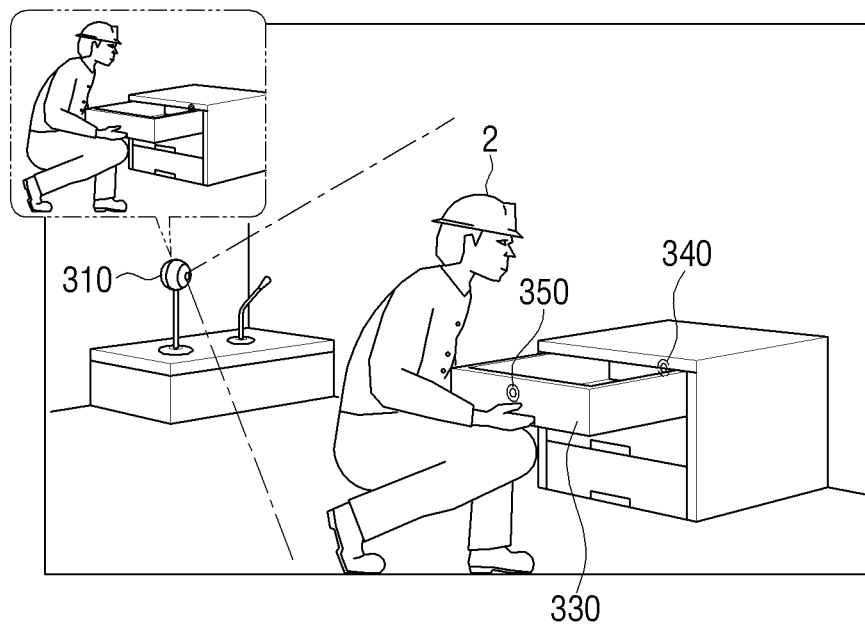

A situation may be met that satisfies the condition. For example, as shown in FIG. 3D, a situation may occur in which the other person 2 opens the drawer 330 indicated by the user's finger.

In an exemplary embodiment, the detection resources 340 and 350 may detect an event according to the condition. For example, the distance detection sensor 340 may detect an event in which a drawer is opened, and the fingerprint recognition sensor 350 may detect an event that recognizes another person.

The detection resources 340 and 350 may transmit the detection result of the event to the processor 120.

The processor 120 may, when at least one event satisfying the condition is detected, control the function according to the action to be executed based on the received detection result.

For example, when there are a plurality of events necessary for satisfying the condition, the processor 120 may, when all the plurality of events satisfy the condition, determine that the condition is satisfied and may control the function according to the action to be executed.

The processor 120 may transmit the control information so that the selected execution resource executes the function according to the action. For example, the processor 120 may transmit control information requesting execution of the recording function to the camera 310 located near the drawer 330. Accordingly, the camera 310 can record the situation in which the person 2 opens the drawer 330 as an image.

As described above, when the condition according to the user's behavior is set, a visual If This Then That (IFITT) environment using the camera 310 can be established.

FIGS. 4A to 4D are diagrams illustrating situations in which an action according to a condition is executed in the electronic device 100, according to an exemplary embodiment of the present disclosure.

Figure 4A:
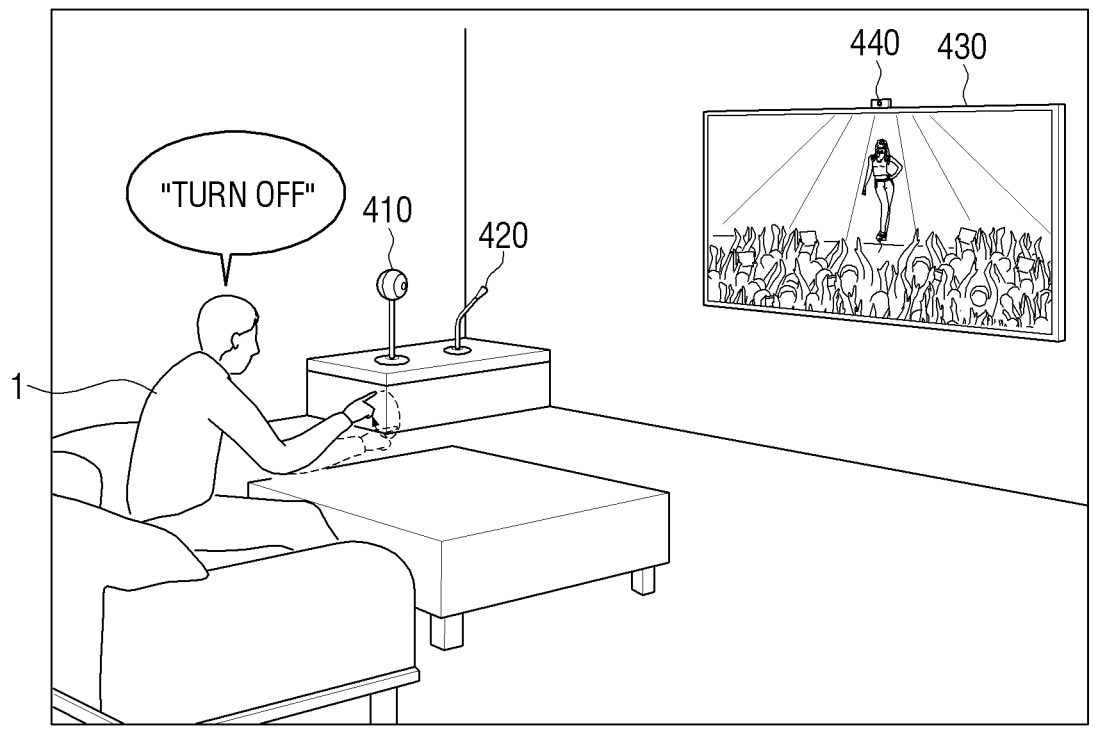

In FIG. 4A, the user 1 may utter a natural language (e.g., phrase) while performing a specific action in order to set an action to be executed according to a condition.

For example, the user 1 may speak a natural language as "turn off" while pointing at the TV 430 with a finger and performing a gesture to rotate the finger clockwise.

In this example, the condition may be that the user 1 rotates his or her finger in a clockwise direction towards the TV 430, and the action in accordance with the condition may be to turn off the TV 430.

In another exemplary embodiment, the user 1 may speak a natural language as "turn off" while performing a gesture indicating the TV 430 with a finger.

In this example, the condition may be a situation where the user 1 speaks "turn off" while pointing a finger toward the TV 430, and the action may be to turn off the TV 430.

Peripheral devices 410 and 420 located in the vicinity of the user 1 may generate image information and voice information from a behavior of the user 1 and a natural language associated with the behavior of the user 1. For example, the camera 410 may photograph a gesture of pointing at a TV with a finger and rotating the finger to generate image information, and the microphone 420 may receive the natural language "turn off" to generate voice information.

Figure 4B:
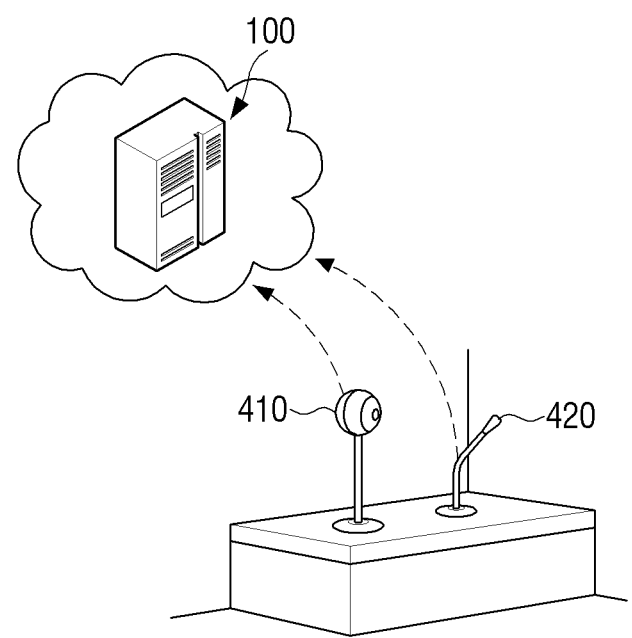

In FIG. 4B, the peripheral devices 410 and 420 may transmit the generated voice information and image information to the electronic device 100.

In an exemplary embodiment, the peripheral devices 410 and 420 may transmit the information to the electronic device 100 via a wired or wireless network. In another exemplary embodiment, in the case where the peripheral devices 410 and 420 are part of the electronic device 100 as shown in FIG. 1B, the peripheral devices 410 and 420 may transmit the information to the processor 100 of the electronic device 100 via an interface, such as a data communication line or bus.

In an exemplary embodiment, the processor 120 of the electronic device 100 may acquire voice information from a natural language through the communicator 150 and acquire image information from a user's action associated with the natural language. In another exemplary embodiment, when the peripheral devices 410 and 420 are part of the electronic device 100 as shown in FIG. 1C, the processor 120 may acquire audio information and image information generated from the user's action through an interface such as a bus.

The processor 120 may determine at least one event to be detected according to the condition. The processor 120 may determine, when at least one event is detected, a function to be executed according to the action, based on the acquired voice information and image information.

For example, the processor 120 may determine an event that recognizes a gesture that rotates a finger clockwise toward the TV 430 as an event to detect. The processor 120 may determine that the function of turning off the TV 430 is a function to perform according to an action.

The processor 120 may select at least one detection resource for detecting at least one event among the available resources.

In this example, the at least one detection resource may be a camera 440 installed on top of the TV 430 and an image recognition module (not shown) recognizing the gesture, which may sense the gesture of the user 1. The image recognition module may be part of the camera 440 or part of the electronic device 100. The image recognition module is described as part of the camera 440 in this disclosure, but the image recognition module may be implemented as part of the electronic device 100 as understood by one of ordinary skill in the art.

The processor 120 may determine at least one execution resource for executing a function according to an action among the available resources.

In this example, at least one execution resource may be the TV 430 itself capable of being turned off.

Figure 4C:
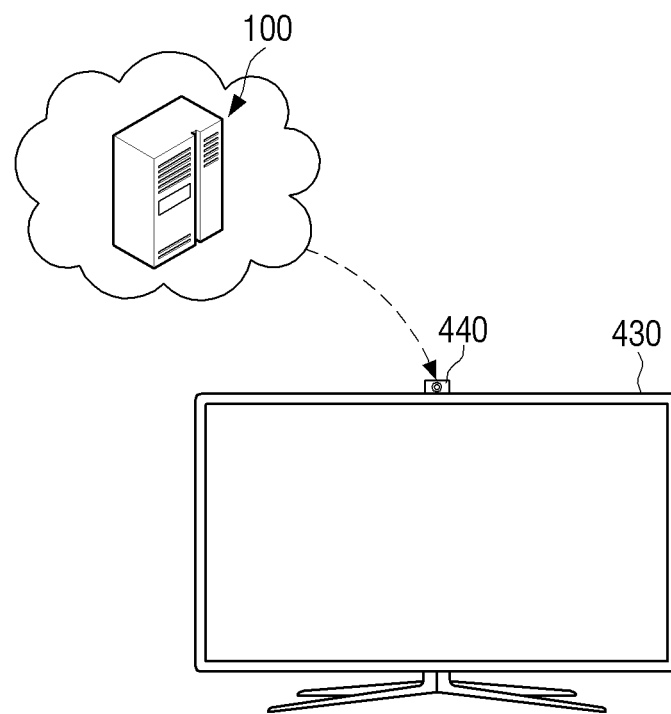

If at least one detection resource is selected, the processor 120 may transmit control information requesting detection of the event according to the condition to the selected detection resource 440, as shown in FIG. 4C.

The detection resource 440 receiving the control information may monitor whether or not an event according to the condition is detected.

Figure 4D:
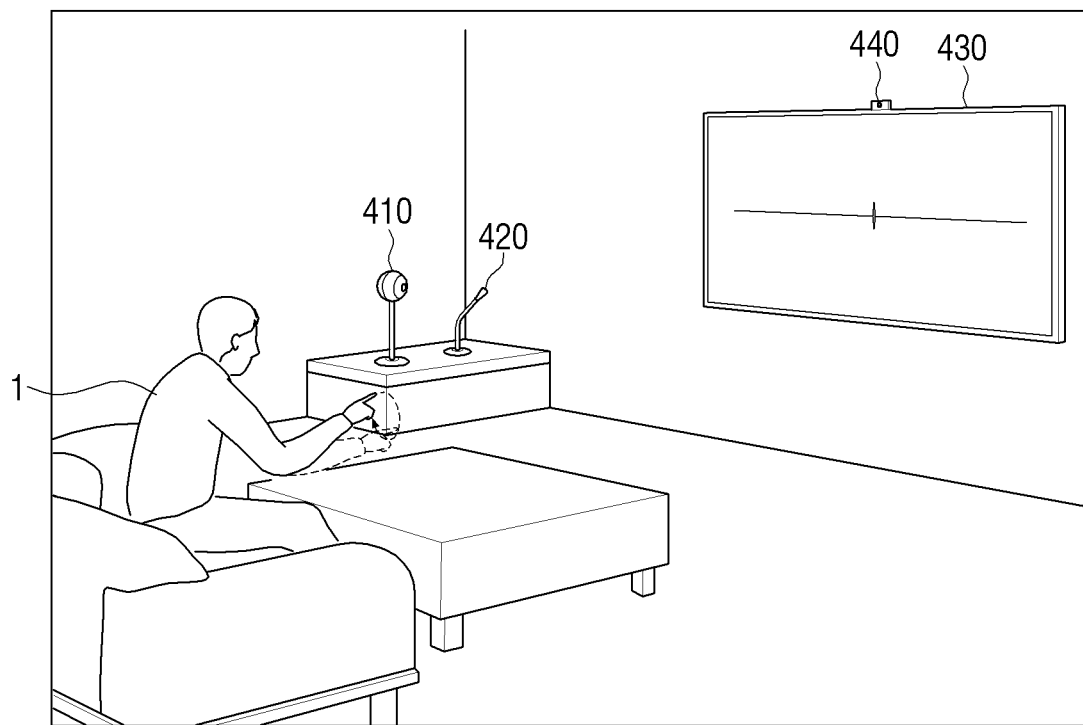

A situation may be met when satisfying the condition. For example, as shown in FIG. 4D, during the reproduction of the TV 430, a situation may occur in which the user rotates the finger toward the TV 430.

In this case, the camera 440 as a detection resource may detect an event according to the condition. For example, the camera 440 may detect an event that recognizes a gesture that rotates a finger in a clockwise direction.

The detection resource 440 may transmit the detection result of the event to the processor 120.

The processor 120 may, when at least one event satisfying the condition is detected, control the function according to the action to be executed based on the received detection result.

For example, the processor 120 may transmit control information requesting the TV 430 to turn off the TV 430. Accordingly, the TV 430 may turn off the screen being reproduced.

As described above, when setting conditions according to the user's behavior for a home appliance (e.g., TV, etc.), a universal remote control environment for controlling a plurality of home appliances with a unified gesture may be established.

FIGS. 5A to 5D are diagrams illustrating situations in which an action according to a condition is executed in the electronic device 100, according to an exemplary embodiment of the present disclosure.

Figure 5A:
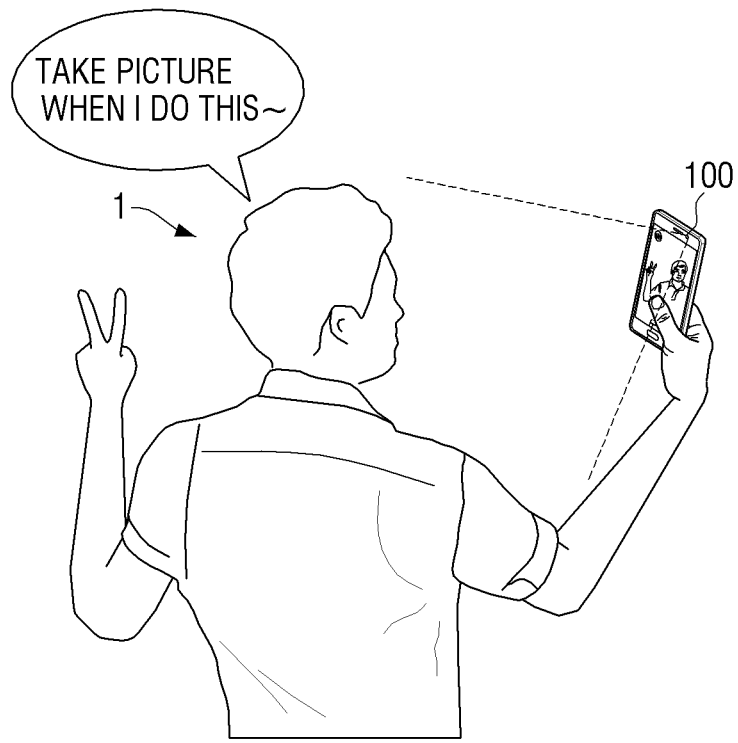

In FIG. 5A, the user 1 may utter a natural language (e.g., a phrase) while performing a specific action in order to set an action to be executed according to a condition.

For example, the user 1 may create a 'V'-like gesture with his/her finger and utter a natural language saying "take a picture when I do this".

In this example, the condition may be a situation of making a 'V' shaped gesture, and an action according to the condition may be that an electronic device (for example, a smartphone with a built-in camera) 100 photographs the user.

In another exemplary embodiment, the user 1 may speak a natural language saying "take a picture if the distance is this much" while distancing the electronic device 100 over a certain distance.

In this example, the condition may be such that the user 1 distances the electronic device 100 over a certain distance, and the action according to the condition may be that the electronic device 100 photographs the user 1.

In another exemplary embodiment, when the subjects to be photographed including the user 1 are within the shooting range of the electronic device 100, the user 1 may speak a natural language as "take a picture when all of us come in."

In this example, the condition may be a situation in which the subjects to be photographed including the user 1 are within the shooting range of the electronic device 100, and the action in accordance with the condition may be that the electronic device 100 photographs the subjects.

In another exemplary embodiment, the subjects including the user 1 may jump, and the user 1 may utter the natural language as "take a picture when all of us jump like this".

In this example, the condition may be a situation in which the subjects to be photographed including the user 1 jump into the shooting range of the electronic device 100, and the action in accordance with the condition may be that the electronic device 100 photographs the subjects.

In another exemplary embodiment, the user 1 may speak a natural language such as "take a picture when the child laughs", "take a picture when the child cries", or "take a picture when the child stands up".

In this example, the condition may be a situation where the child laughs, cries, or stands up, and an action according to the condition may be that the electronic device 100 photographs the child.

In another exemplary embodiment, the user 1 may speak the natural language as "take a picture when I go and sit" while mounting the electronic device 100 at a photographable position.

In this example, the condition may be a situation in which the user 1 sits while the camera is stationary, and an action according to the condition may be that the electronic device 100 photographs the user.

The camera 130 and the microphone 140 built in the electronic device 100 may generate image information and audio information from a user's behavior and a natural language related to the user's behavior. For example, the camera 130 may photograph a 'V' shaped gesture to generate image information, and the microphone 140 may receive the natural language of "take a picture when I do this" to generate voice information.

Figure 5B:
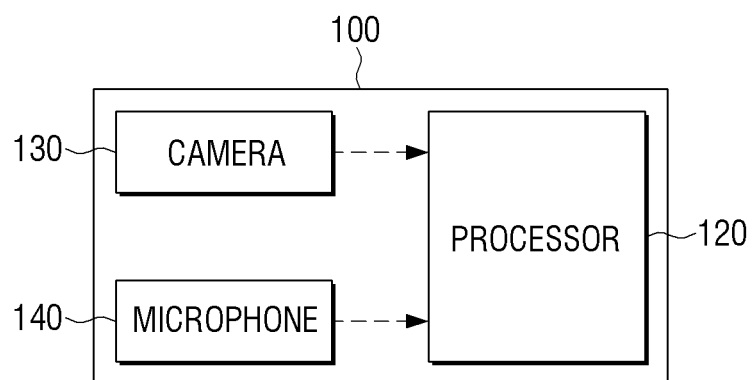

In FIG. 5B, the camera 130 and the microphone 140 may transmit the generated audio information and image information to the processor 120.

The processor 120 may determine at least one event to be detected according to the condition. The processor 120 may determine, when at least one event is detected, an execution function according to the action, based on the acquired voice information and image information.

For example, the processor 120 determines an event that recognizes a 'V' shaped gesture as an event to detect. The processor 120 determines the function of photographing as an action to be performed according to the action.

The processor 120 selects at least one detection resource for detecting at least one event among the various types of sensible modules available in the electronic device 100, which are available resources.

In this example, the at least one detection resource may be a camera 130 provided in the electronic device 100 and an image recognition module (not shown) recognizing the gesture. The image recognition module may be included in the camera 130, or may be part of the processor 120.

The processor 120 selects at least one execution resource for executing functions according to an action among various types of modules capable of providing detection functions provided in the electronic device 100, which are available resources.

In this example, at least one execution resource may be a camera 130 provided in the electronic device 100.

Figure 5C:
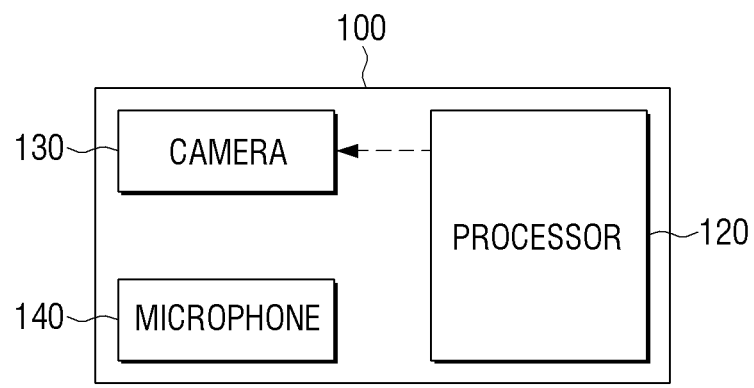
Figure 5D:
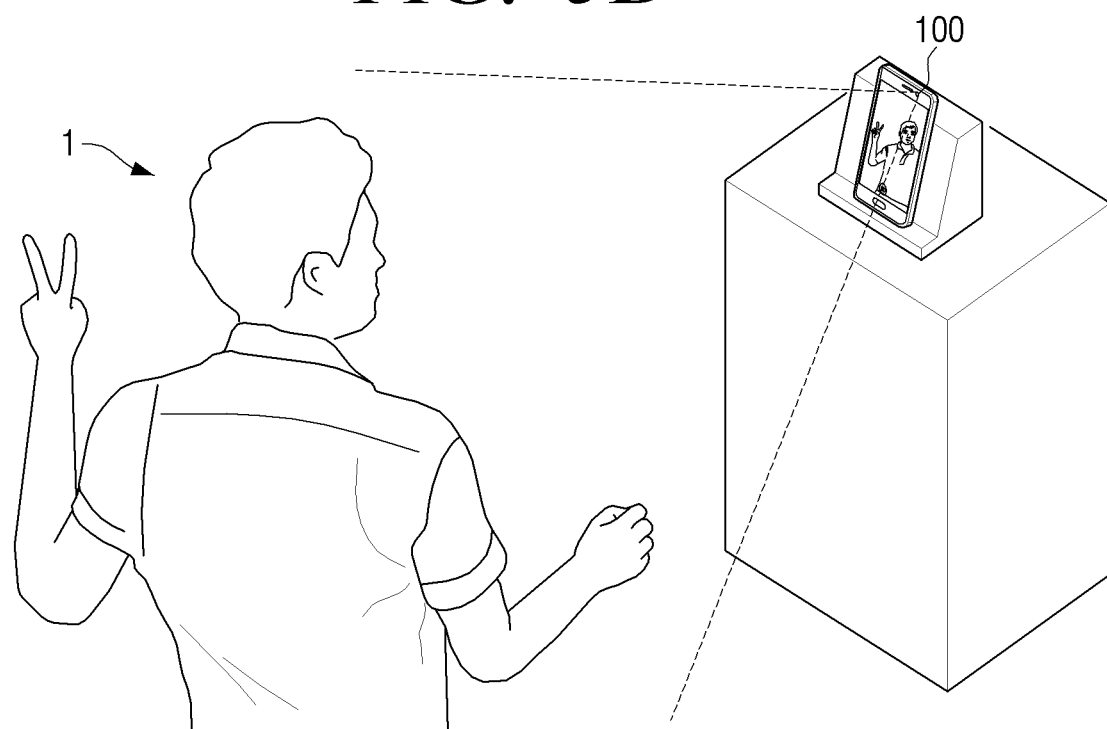

The processor 120 transmits control information requesting detection of the event according to the condition to the selected detection resource 130, as shown in FIG. 5C.

The detection resource 130 receiving the control information monitors whether or not an event according to the condition is detected.

A situation is met when satisfying the condition. For example, as shown in FIG. 4D, a situation occurs in which the user 1 performs a 'V' shaped gesture toward the camera.

In this example, the camera 410 as a detection resource detects an event according to the condition. For example, the camera 410 determines an event that recognizes a 'V' shaped gesture.

The detection resource 410 transmits the detection result of the event to the processor 120.

The processor 120, when at least one event satisfying the condition is detected, controls the function according to the action to be executed based on the received detection result.

For example, the processor 120 sends control information requesting the camera 130 to take a picture. Accordingly, the camera 130 executes a function of photographing the user.

In an exemplary embodiment, when the camera 130 automatically performs photographing in accordance with the conditions set by the user, the user's experience of using the camera 130 can be improved by providing the user with a natural and convenient user interface for shooting. The user may present conditions for more flexible and complex photographing or recording. The camera may automatically perform shooting when the condition is satisfied, thereby improving the user's experience with the electronic device 100.

Figure 6:
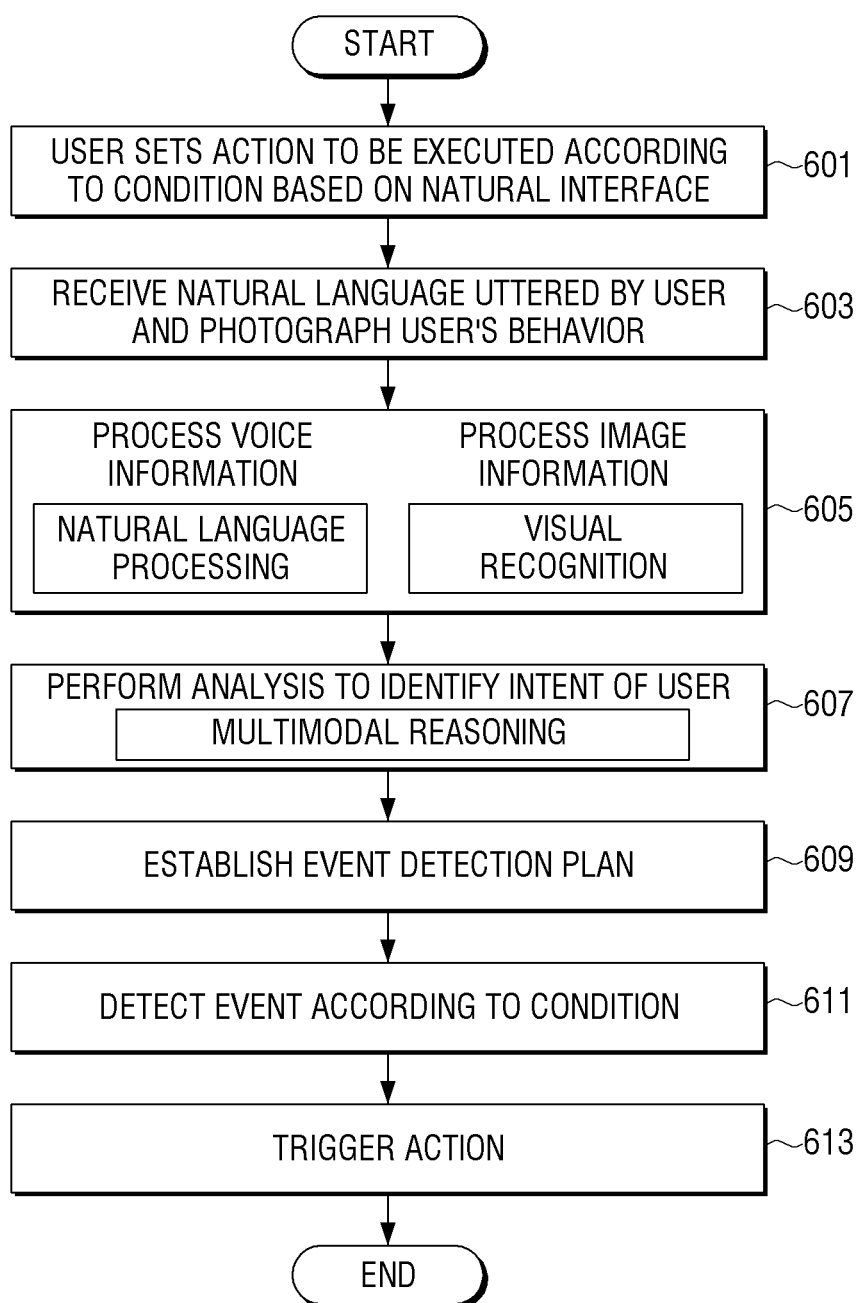
FIG. 6 is a flowchart showing the execution of an action according to a condition, according to an exemplary embodiment of the present disclosure.

FIG. 6 is a flowchart of executing an action according to a condition in the electronic device 100, in accordance with an exemplary embodiment of the present disclosure.

A user sets an action to be executed according to a condition based on a natural interface (601).

The natural interface may be, for example, speech, text or gestures, for uttering a natural language. In an exemplary embodiment, a condition and an action to be executed according to the condition may be configured as a multi-model interface.

In an example, the user may perform a gesture of pointing to the drawer with a finger, while saying "when the drawer here is opened". The user may perform a gesture of pointing to the TV with a finger while saying "display a notification message on the TV there" as an action to be executed according to the condition.

In an example, the user may utter "if the condition is a pleasant family atmosphere" as a condition and utter "store an image" as an action to be executed according to the condition.

In an example, the user may utter "if the window is open in the evening" as a condition and utter "tell me to close the window" in an action to be performed according to the condition.

In an example, the user may utter "if the child smiles" as a condition and utter "save an image" as an action to perform according to the condition.

In an example, the user may, as a condition, utter "if I get out of bed in the morning and go out into the living room" and utter "tell me the weather" as an action to perform according to the condition.

In an example, the user may utter "when I lift my fingers toward the TV" as a condition and utter "If the TV is turned on, turn it off, and if it is off, turn it on" as an action to perform according to the condition.

In an example, the user may utter "If I do a push-up" as a condition and utter "give an order" as an action to be executed according to the condition.

In an example, the user may utter "when no one is here when a stranger comes in" as a condition and utter "record an image and contact family" as an action to perform according to the condition.

In an example, the user may utter "when there is a loud sound outside the door" as condition, and may perform a gesture of pointing a finger toward the TV while uttering "turn on the camera attached to the TV and show it on the TV" as an action to be performed according to the condition.

When the user sets an action to be executed according to the condition, the user's peripheral device receives the natural language that the user utters and may photograph the user's behavior (603).

The processor 120 acquires voice information generated based on a natural language and image information generated based on shooting from peripheral devices, and the processor 120 processes the acquired voice information and image information (605). For example, the processor 120 may convert the acquired voice information into text using a natural language processing technique, and may recognize an object and peripheral environment included in the image information using a visual recognition technique.

In an exemplary embodiment, the processor 120 analyzes or interprets the processed voice information and the video information to understand the intention of the user. For example, the processor 120 may analyze voice information and image information using a multimodal reasoning technique. In this example, the processor 120 may analyze the voice information and the image information based on a data recognition model using a learning algorithm (e.g., a neural network algorithm, a genetic algorithm, a decision tree algorithm, a support vector machine, etc.). The processor 120 may determine the user's intention, determine a condition and an action to be performed according to the condition, and may also determine at least one event requiring detection according to the condition.

In this example, the processor 120 may check a condition according to the analysis result and an action to be executed according to the condition, in order to clearly identify the intention of the user.

According to various exemplary embodiments, the processor 120 may provide a user with a confirmation user interface (UI) as feedback to confirm conditions and actions.

In an example, the processor 120 provides a confirmation UI that "is it right to record when the second drawer is opened on the right desk" by voice or image using the electronic device 100 or a peripheral device. In this example, when a user input that accepts the confirmation UI is received, the processor 120 determines a condition and an action to be executed according to the condition. In another example, when a user input rejecting the confirmation UI is received, the processor 120 provides a UI requesting the user's utterance and action to set an action to be executed according to the condition using the electronic device 100 or peripheral device.

The processor 120 establishes an event detection plan (609). For example, the processor 120 selects at least one detection resource for detecting at least one event determined (607). In this example, the processor 120 may determine at least one detection resource for detecting at least one event based on a data recognition model generated using a learning algorithm (e.g., a neural network algorithm, a genetic algorithm, a decision tree algorithm, or a support vector machine).

The processor 120 may search for available resources that are already installed. In an exemplary embodiment, the available resources may be available resources that are located at a place where an event according to a condition is detectable or located at a place where a function according to an action is executable, in order to execute an action according to a condition set by the user.

The available resources may transmit information about their capabilities to the processor 120 in response to a search of the processor 120.

The processor 120 may determine at least one detection resource to detect an event among the available resources based on the detectable function among the functions of the available resources.

Detectable functions may include a function to measure a physical quantity, such as gesture sensing function, air pressure sensing function, magnetic sensing function, acceleration sensing function, proximity sensing function, color sensing function, temperature sensing function, humidity sensing function, distance sensing function, pressure sensing function, touch sensing function, illumination sensing function, wavelength sensing function, smell or taste sensing function, fingerprint sensing function, iris sensing function, voice input function or image shooting function, or may include a function to detect a state of a peripheral environment and convert the detected information to an electrical signal.

In another exemplary embodiment, when the same functions among the detectable functions of the available resources exist, the processor 120 may determine the detected resources according to the priority of the function. For example, it is possible to determine at least one detection resource to detect an event in consideration of priorities such as a detection range, a detection period, a detection performance, or a detection period of each of the detectable functions.

In an example, when the condition set by the user is "when the window is open in the room when no one is in the room", the processor 120 may select a motion sensor that detects an event that an object in the room moves, a camera for detecting an event to recognize a person in the room, and a window opening sensor for detecting an event in which a window is opened, as detection resources.

In this example, when an event without movement of an object is detected from the motion sensor, an event without a person in the room is detected from the camera, and an event in which a window is open is detected, the processor 120 may establish a detection plan as an event satisfying the condition is detected. In another example, if at least one event among the events is not detected, the processor 120 may determine that a situation where the condition is not satisfied occurred.

The processor 120 may provide a situation according to the condition set by the user as the input value of the model using the previously learned data recognition model, and according to the established detection plan, may determine whether the available resource can detect an event according to the condition. This can be defined as an event detection method based on multimodal learning.

The processor 120 may determine at least one execution resource to execute the function according to the action among the available resources based on the functions that the available resources can provide. In an exemplary embodiment, the processor 120 may determine at least one execution resource for performing other functions on the action based on a data recognition model generated using a learning algorithm (e.g., a neural network algorithm, a genetic algorithm, a decision tree algorithm, or a support vector machine).

For example, the executable functions include the above-described detectable functions, and may be at least one of a display function, an audio playback function, a text display function, a video shooting function, a recording function, a data transmission function, a vibration function, or a driving function for transferring power.

In another exemplary embodiment, when the same functions among the executable functions of the available resources exist, the processor 120 may determine execution resources according to the priority of the function. For example, it is possible to determine at least one execution resource to execute a function according to an action in consideration of priority such as execution scope, execution cycle, execution performance or execution period of each of the executable functions.

According to various exemplary embodiments, the processor 120 may provide a confirmation UI as feedback for the user to confirm the established event detection plan.

In an example, the processor 120 may provide a confirmation UI "Recording starts when the drawer opens. Open the drawer now to test." by voice using the electronic device 100 or the user's peripheral device. The processor 120 may display a drawer on a screen of a TV that performs a recording function as an action in response to an event detection.

According to various exemplary embodiments, the processor 120 may analyze common conditions of a plurality of events to optimize the detection resources to detect events if there are multiple events to detect according to the condition.

In an example, if the condition set by the user is "when a drawer is opened by another person", the processor 120 may determine that the event to be detected according to the condition is an event in which the drawer is opened and an event in which the person is recognized. In this example, the processor 120 may select a distance sensing sensor attached to the drawer as a detection resource to detect a drawer opening event, and a camera around the drawer as a detection resource to detect an event that recognizes another person. The processor 120 may optimize the plurality of events into one event where the camera recognizes that another person opens the drawer.

According to various exemplary embodiments, the processor 120 may substitute the available resources that detect a particular event with other available resources, depending on the situation of the available resources. In another exemplary embodiment, the processor 120 may determine whether to detect an event according to the condition according to the situation of the available resources, and may provide feedback to the user when the event cannot be detected.

For example, if the condition set by the user is "when another person opens the drawer over there", the processor 120 may replace the camera, in the vicinity of the drawer, with a fingerprint sensor, provided in the drawer, to detect an event for recognizing another person if the camera around the drawer is inoperable.

In an exemplary embodiment, if there is no available resource for detecting an event recognizing another person, or if the event cannot be detected, the processor 120 may provide the user with a notification UI with feedback indicating that the execution of the condition is difficult.

For example, the processor 120 may provide the user with a notification UI that "a condition corresponding to another person cannot be performed".

When a situation satisfying the condition occurs, the detection resource determined by the processor 120 may detect the event according to the condition (611).

If it is determined that an event satisfying the condition is detected based on the detection result, the processor 120 may execute the function according to the action set by the user. This situation may be referred to as triggering, by the processor 120, an action set by the user according to the condition in response to the trigger condition described above, at step 613.

Figure 7:
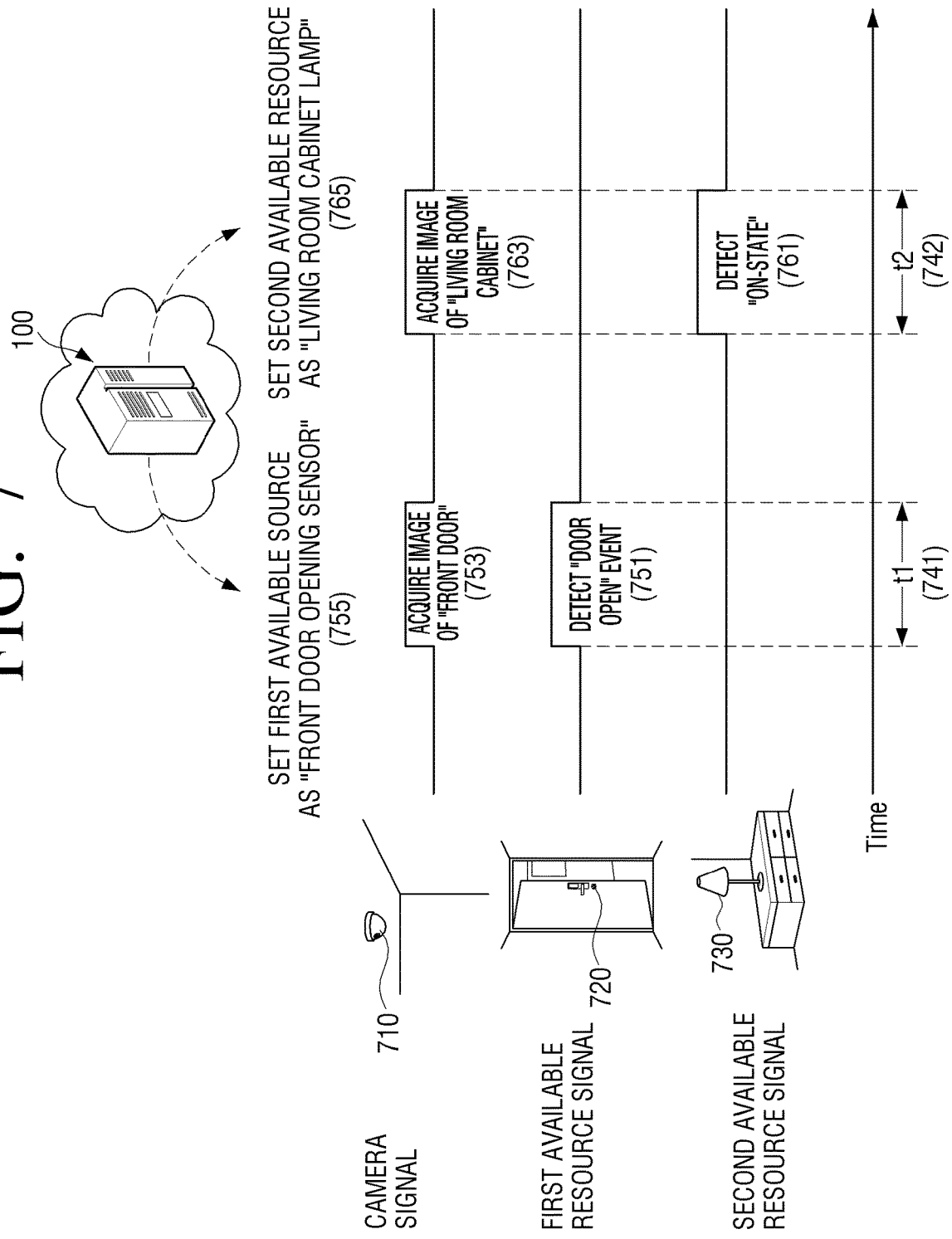
FIG. 7 is a diagram illustrating a process of setting identification information of available resources, according to an exemplary embodiment of the present disclosure.

FIG. 7 is a diagram illustrating a process of setting identification information of available resources in the electronic device 100, according to an exemplary embodiment of the present disclosure.

A camera 710 may be located near the available resources 720, 730 and can capture the state of the available resources 720, 730.

The camera 710 may capture the available resources 720 and 730 in real time, at a predetermined period, or at the time of event occurrence.

During a period of time, an event or the operating state of available resources in the first available resource (e.g., a touch sensor or distance sensor) 720 and the second available resource (e.g., digital ramp) 730 may be detected.

In an exemplary embodiment, the camera 710 may transmit the image information of the available resources 720 and 730 photographed or recorded for a predetermined time to the electronic device 100. The available resources 720 and 730 may transmit the detected information to the electronic device 100.

For example, during time t1 741, in which the user opens a door, the first available resource 720 detects (751) the door open event and sends the detection result to the electronic device 100. The camera 710 located in the vicinity of the first available resource 720 acquires image information by photographing the first available resource 720 located at the first location during time t1 741 (753). The camera 710 transmits the acquired image information to the electronic device 100.

In an exemplary embodiment, the electronic device 100 may automatically generate identification information of the first available resource 720, based on the detection result detected by the first available resource 720, and the image information obtained by photographing the first available resource 720. The identification information of the first available resource 720 may be determined based on the first location, which is the physical location of the first available resource 720, and the type of the first available resource 720 or the attribute of the detection result.

For example, when the first location is the front door and the type of the first available resource 720 is a touch sensor or a distance sensing sensor capable of sensing movement or detachment of an object, the electronic device 100 may set the identification information of the first available resource 720 as "front door opening sensor" (755).

The electronic device 100 may automatically map the detection result received by the first available resource 720 and the image information generated by photographing the first available resource 720 and may automatically set a name or label for the first available resource 720.

In an exemplary embodiment, when the electronic device 100 automatically generates the identification information of the first available resource 720, the electronic device 100 automatically generates the identification information of the first available resource 720 using a data recognition model generated using a learning algorithm (e.g., a neural network algorithm, a genetic algorithm, a decision tree algorithm, or a support vector machine).

In another exemplary embodiment, during time t2 742 when the user opens the door, the second available resource 730 may be changed to the user's operation or automatically turned on. The second available resource 730 detects (761) its own on-state and sends the on-state to the electronic device 100.

The camera 710 located in the vicinity of the second available resource 730 acquires image information by photographing the second available resource 730 located at the second location during time t2 742 (763). The camera 710 transmits the acquired image information to the electronic device 100.

In an exemplary embodiment, the electronic device 100 may automatically generate the identification information of the second available resource 730 based on the operating state of the second available resource 730 and the image information of the second available resource 730. The identification information of the second available resource 730 may be determined based on, for example, the properties of the second location, which is the physical location of the second available resource 730, and the type or operating state of the second available resource 730.

For example, if the second location is on the cabinet of the living room and the type of the second available resource 730 is a lamp, the electronic device 100 may set the identification information of the second available resource 730 to "living room cabinet lamp" (765).

According to various exemplary embodiments, the electronic device 100 may set the identification information of the available resources based on the initial installation state of the available resources and the image information obtained from the camera during installation, even when the available resources are initially installed.

According to various exemplary embodiments, the electronic device 100 may provide a list of available resource identification information using a portable terminal provided by a user or an external device having a display around the user. In an exemplary embodiment, the portable terminal or the external device may provide the user with a UI capable of changing at least a part of the identification information of the available resource. When the user changes the identification information of the available resource in response to the provided UI, the electronic device 100 may receive the identification information of the changed available resource from the portable terminal or the external device. Based on this identification information of the available resource, the electronic device 100 may reset the identification information of the available resource.

Figure 8:
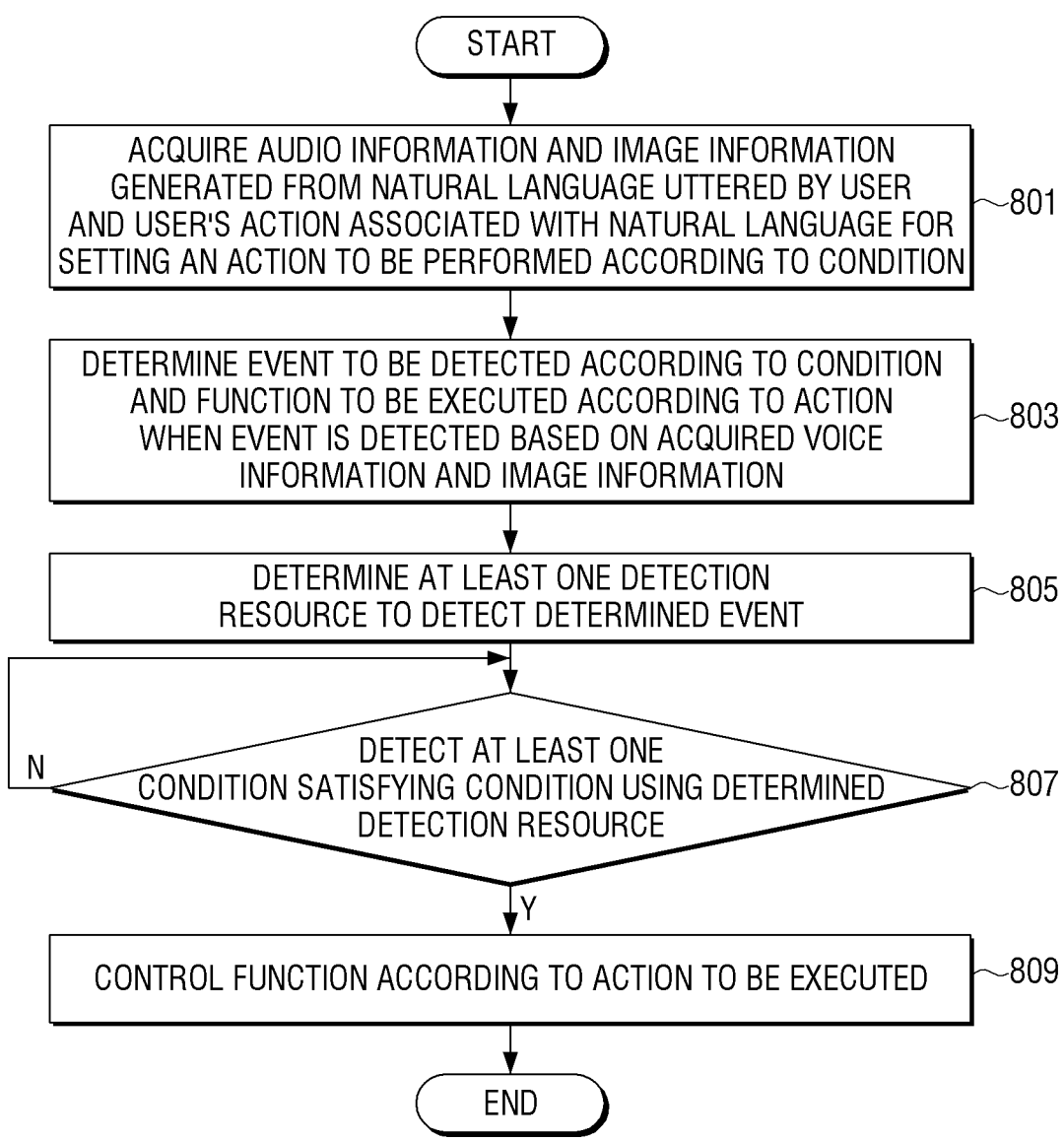
FIGS. 8 and 9 are flowcharts showing the execution of an action according to a condition, according to an exemplary embodiment of the present disclosure.

FIG. 8 is a flowchart of executing an action according to a condition in the electronic device 100, in accordance with an exemplary embodiment of the present disclosure.

In an exemplary embodiment, the electronic device 100 acquires audio information and image information generated from a natural language uttered by the user and user's actions associated with the natural language, for setting an action to be performed according to a condition (801). The audio information is generated from a natural language (e.g. a phrase) uttered by the user. The image information is generated from a user's actions associated with the natural language. The electronic device 100 acquires the audio information and image information to set an action to be performed when a condition is met. In an exemplary embodiment, the electronic device 100 acquires at least one of an audio information and image information to set an action to be performed when a condition is met.

The electronic device 100 determines an event to be detected according to a condition and a function to be executed according to the action when the event is detected, based on the acquired voice information and image information (803).

In an exemplary embodiment, the electronic device 100 applies the acquired voice information and image information to a data recognition model generated using a learning algorithm to determine a condition and action according to the user's intention. The electronic device 100 determines an event to be detected according to a condition and a function to be executed according to the action.

The electronic device 100 determines at least one detection resource to detect a determined event (805). The detection resource may be a module included in the electronic device 100 or in an external device located outside the electronic device 100.

The electronic device 100 may search for available resources that are installed and may determine at least one detection resource to detect an event among the available resources based on a function detectable by the retrieved available resources.

In an exemplary embodiment, if there is no resource to detect an event, or if the detection resource is in a situation in which an event cannot be detected, the electronic device 100 provides a notification UI informing that execution of an action according to the condition is impossible.

The electronic device 100 may use the determined at least one detection resource to determine if at least one event satisfying the condition has been detected (decision block 807).

As a result of the determination, if at least one event satisfying the condition is detected, (decision block 807 "YES" branch), the electronic device 100 controls the function according to the action to be executed (809) and ends.

For example, when the detection result of the event is received from the detection resource, the electronic device 100 may control the function according to the action to be executed based on the received detection result.

Figure 9:
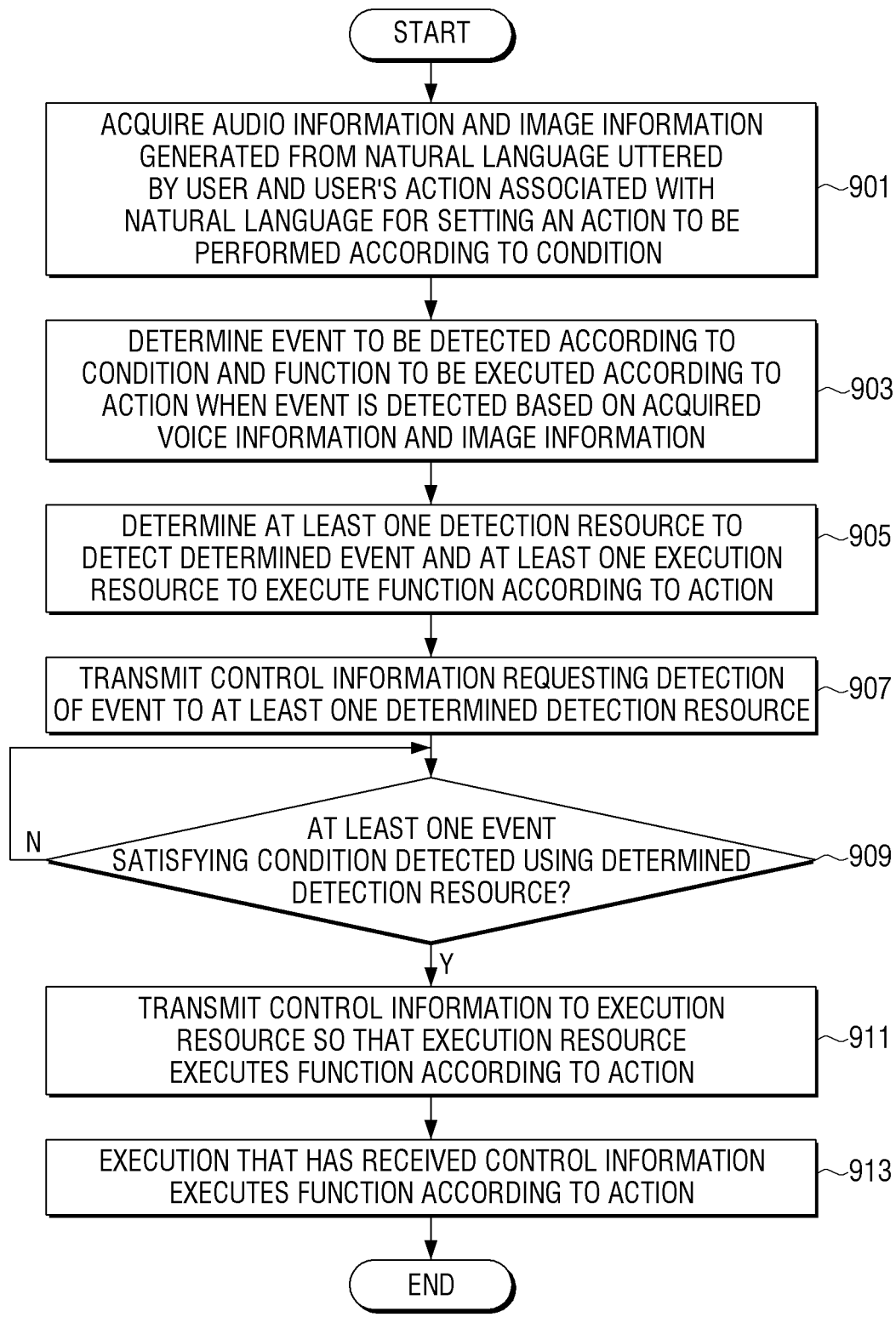

FIG. 9 is a flowchart of executing an action according to a condition in the electronic device 100, in accordance with another exemplary embodiment of the present disclosure.

In an exemplary embodiment, the electronic device 100 acquires audio information and image information generated from a natural language uttered by the user and user's actions associated with the natural language, for setting an action to be performed according to a condition (901). The audio information is generated from a natural language (e.g.

a phrase) uttered by the user. The image information is generated from a user's actions associated with the natural language. The electronic device 100 acquires the audio information and image information to set an action to be performed when a condition is met. In an exemplary embodiment, the electronic device 100 acquires at least one of an audio information and image information to set an action to be performed when a condition is met.

The electronic device 100 determines an event to be detected according to a condition and a function to be executed according to the action when the event is detected, based on the acquired voice information and image information (903).

The electronic device 100 determines at least one detection resource to detect a determined event and at least one execution resource to execute a function according to an action (905).

For example, the electronic device 100 searches for available installed resources and determines at least one execution resource to execute a function according to an action among the available resources, based on a function that the retrieved available resources can provide.

When at least one detection resource is determined, the electronic device 100 transmits control information, requesting detection of the event, to the determined at least one detection resource (907).

The electronic device 100 determine whether at least one event satisfying the condition has been detected using the detection resource (decision block 909).

As a result of the determination, if at least one event satisfying the condition is detected, (decision block 907 "YES" branch), the electronic device 100 transmits the control information to the execution resource so that the execution resource executes the function according to the action (911).

The execution resource that has received the control information executes the function according to the action (913).

FIGS. 10 to 13 are diagrams for illustrating an exemplary embodiment of constructing a data recognition model and recognizing data through a learning algorithm, according to various exemplary embodiments of the present disclosure. Specifically, FIGS. 10 to 13 illustrate a process of generating a data recognition model using a learning algorithm and determining a condition, an action, an event to detect according to the condition, and a function to be executed according to the action through the data recognition model.

Figure 10:
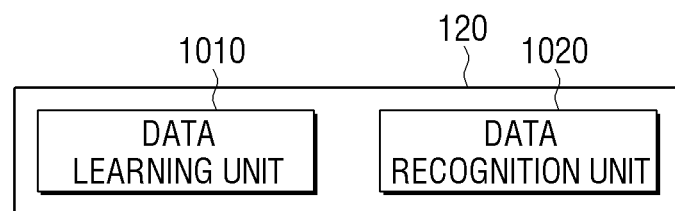
FIGS. 10 to 13 are diagrams for illustrating an exemplary embodiment of constructing a data recognition model through a learning algorithm and recognizing data, according to various exemplary embodiments of the present disclosure.

Referring to FIG. 10, the processor 120 according to some exemplary embodiments may include a data learning unit 1010 and a data recognition unit 1020.

The data learning unit 1010 may generate or make the data recognition model learn so that the data recognition model has a criterion for a predetermined situation determination (for example, a condition and an action, an event according to a condition, determination on a function based on an action, etc.). The data learning unit 1010 may apply the learning data to the data recognition model to determine a predetermined situation and generate the data recognition model having the determination criterion.

For example, the data learning unit 1010 according to an exemplary embodiment of the present disclosure can generate or make the data recognition model learn using learning data related to voice information and learning data associated with image information.

As another example, the data learning unit 1010 may generate and make the data recognition model learn using learning data related to conditions and learning data associated with an action.

As another example, the data learning unit 1010 may generate and make the data recognition model learn using learning data related to an event and learning data related to the function.

The data recognition unit 1020 may determine the situation based on the recognition data. The data recognition unit 1020 may determine the situation from predetermined recognition data using the learned data recognition model. The data recognition unit 1020 can acquire predetermined recognition data according to a preset reference and applies the obtained recognition data as an input value to the data recognition model to determine (or estimate) a predetermined situation based on predetermined recognition data.

The result value by applying the obtained recognition data to the data recognition model may be used to update the data recognition model.

In particular, the data recognition unit 1020 according to an exemplary embodiment of the present disclosure applies the recognition data related to the voice information and the recognition data related to the image information to the data recognition model as the input value, and may acquire the result of the determination of the situation (for example, the action desired to be executed according to the condition and the condition) of the electronic device 100.

The data recognition unit 1020 applies recognition data related to the condition and recognition data related to the action as input values to the data recognition model to determine the state of the electronic device 100 (for example, an event to be detected according to a condition, and a function to perform according to an action).

In addition, the data recognition unit 1020 may apply, to the data recognition model, the recognition data related to an event and recognition data related to a function as input values and acquire a determination result (detection source for detecting an event, execution source for executing a function) which determines a situation of the electronic device 100.

At least a part of the data learning unit 1010 and at least a part of the data recognition unit 1020 may be implemented in a software module or in a form of at least one hardware chip and mounted on an electronic device. For example, at least one of the data learning unit 1010 and the data recognition unit 1020 may be manufactured in the form of a dedicated hardware chip for artificial intelligence (AI), or the existing general purpose processor (e.g.: CPU or application processor) or graphics-only processor (e.g., a GPU) and may be mounted on the various electronic devices described above.

At this time, the dedicated hardware chip for artificial intelligence is a dedicated processor specialized for probability calculation, and it has a higher parallel processing performance than conventional general purpose processors, so that it is possible to quickly process computation tasks in artificial intelligence such as machine learning. When the data learning unit 1010 and the data recognition unit 1020 are implemented as a software module (or a program module including instructions), the software module may be stored in a computer-readable and non-transitory computer readable media). In this case, the software module may be provided by the operating system (OS) or by a predetermined application. A part of the software module may be provided by the operating system (OS) and a part of the remaining portion may be provided by a predetermined application.

In an exemplary embodiment, the data learning unit 1010 and the data recognition unit 1020 may be mounted on one electronic device or on separate electronic devices, respectively. For example, one of the data learning unit 1010 and the data recognition unit 1020 may be included in the electronic device 100, and the other may be included in an external server. The data learning unit 1010 may provide the model information, constructed by the data learning unit 1010, to the data recognition unit 1020, via wire or wirelessly. The data input to the data recognition unit 1020 may be provided to the data learning unit 1010 as additional learning data, via wire or wirelessly.

Figure 11:
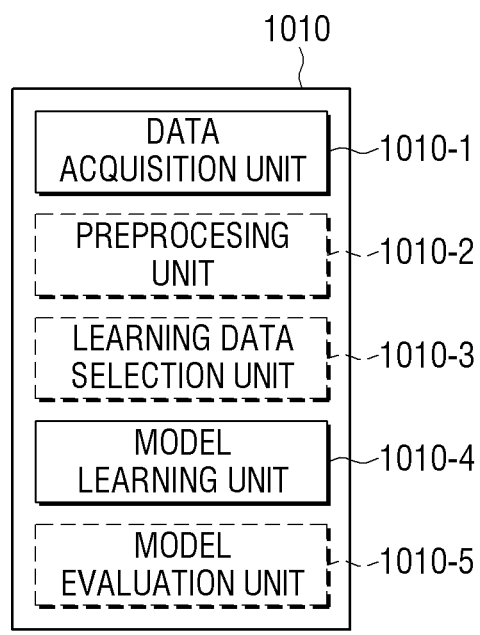

FIG. 11 is a block diagram of a data learning unit 1010 according to exemplary embodiments.

Referring to FIG. 11, the data learning unit 1010 according to some exemplary embodiments may include the data acquisition unit 1010-1 and the model learning unit 1010-4. The data learning unit 1010 may further include, selectively, at least one of the preprocessing unit 1010-2, the learning data selection unit 1010-3, and the model evaluation unit 1010-5.

The data acquisition unit 1010-1 may acquire learning data which is necessary for learning to determine a situation.

The learning data may be data collected or tested by the data learning unit 1010 or the manufacturer of the electronic device 100. Alternatively, the learning data may include voice data generated from the natural language uttered by the user via the microphone according to the present disclosure. The voice data generated from the user's actions associated with the natural language uttered by the user via the camera can be included. In this case, the microphone and the camera may be provided inside the electronic device 100, but this is merely an embodiment, and the voice data and the image data for the action obtained through the external microphone and camera are used as learning data. The model learning unit 1010-4 may use the learning data so that the model learning unit 1010-4 can make the data recognition model learn to have a determination criteria as to how to determine a predetermined situation.

For example, the model learning unit 1010-4 can make the data recognition model learn through supervised learning using at least some of the learning data as a criterion. Alternatively, the model learning unit 1010-4 may make the data recognition model learn through unsupervised learning that the data recognition model learn by itself using learning data without separate guidance.

The model learning unit 1010-4 may learn the selection criteria to use which learning data to determine a situation.

In particular, the model learning unit 1010-4 according to an exemplary embodiment of the present disclosure may generate or make the data recognition model learn using learning data related to voice information and learning data associated with video information. In this case, when the data recognition model is learned through the supervised learning method, an action to be executed may be added as learning data in accordance with conditions and conditions according to the user's intention as a determination criterion. Alternatively, an event to be detected according to the condition and a function to be executed for the action may be added as learning data. Alternatively, a detection resource for detecting the event and an execution resource for executing the function may be added as learning data.

The model learning unit 1010-4 may generate and make the data recognition model learn using learning data related to the conditions and learning data related to an action.

In this case, when making the data recognition model learn through the supervised learning method, an event to be detected according to a condition and a function to be executed for the action can be added as learning data. Alternatively, a detection resource for detecting the event and an execution resource for executing the function may be added as learning data.

The model learning unit 1010-4 may generate and make the data recognition model learn using learning data related to an event and learning data related to a function.

In this case, when making the data recognition model learn through the supervised learning, a detection resource for detecting an event and an execution resource for executing the function can be added as learning data.

In the meantime, the data recognition model may be a model which is pre-constructed and updated by learning of the model learning unit 1010-4. In this case, the data recognition model may receive the basic learning data (for example, a sample image, etc.) and be pre-constructed.

The data recognition model can be constructed in consideration of the application field of the recognition model, the purpose of learning, or the computer performance of the apparatus. The data recognition model may be, for example, a model based on a neural network. The data recognition model can be designed to simulate the human brain structure on a computer. The data recognition model may include a plurality of weighted network nodes that simulate a neuron of a human neural network. The plurality of network nodes may each establish a connection relationship such that the neurons simulate synaptic activity of sending and receiving signals through synapses. The data recognition model may include, for example, a neural network model or a deep learning model developed in a neural network model. In the deep learning model, the plurality of network nodes are located at different depths (or layers) and can exchange data according to a convolution connection relationship.

The data recognition model may be constructed considering the application field of the recognition model, the purpose of learning, or the computer performance of the device. The data recognition model may be, for example, a model based on a neural network. For example, a model such as Deep Neural Network (DNN), Recurrent Neural Network (RNN), and Bidirectional Recurrent Deep Neural Network (BDNR) may be used as a data recognition model, but the present disclosure is not limited thereto.

According to various exemplary embodiments, the model learning unit 1010-4 may be a data recognition model for learning a data in which the input learning data and the basic learning data are highly relevant, when a plurality of pre-built data recognition models are present. In an exemplary embodiment, the basic learning data may be pre-classified according to a data type, and the data recognition model may be pre-built for each data type. For example, the basic learning data may be pre-classified by various criteria such as an area where the learning data is generated, a time at which the learning data is generated, a size of the learning data, a genre of the learning data, a creator of the learning data, a kind of objects in learning data, etc.

In another exemplary embodiment, the model learning unit 1010-4 may teach a data recognition model using, for example, a learning algorithm including an error back-propagation method or a gradient descent method.

Also, the model learning unit 1010-4 may make the data recognition model learn through supervised learning using, for example, a determination criterion as an input value. Alternatively, the model learning unit 1010-4 may learn by itself using the necessary learning data without any supervision, for example, through unsupervised learning for finding a determination criterion for determining a situation. Also, the model learning unit 1010-4 may make the data recognition model learn through reinforcement learning using, for example, feedback as to whether or not the result of the situation determination based on learning is correct.

In an exemplary embodiment, when the data recognition model is learned, the model learning unit 1010-4 may store the learned data recognition model. The model learning unit 1010-4 may store the learned data recognition model in the memory 110 of the electronic device 100. The model learning unit 1010-4 may store the learned data recognition model in a memory of a server connected to the electronic device 100 via a wired or wireless network.

The data learning unit 1010 may further include a preprocessing unit 1010-2 and a learning data selection unit 1010-3 in order to improve a recognition result of the data recognition model or save resources or time necessary for generation of the data recognition model.

A preprocessor 1010-2 may perform preprocessing of data acquired by the data acquisition unit 1010-1 to be used for learning to determine a situation.

For example, the preprocessing unit 1010-2 may process the acquired data into a predefined format so that the model learning unit 1010-4 may easily use data for learning of the data recognition model. For example, the preprocessing unit 1010-2 may process the voice data obtained by the data acquisition unit 1010-1 into text data, and may process the image data into image data of a predetermined format. The preprocessed data may be provided to the model learning unit 1010-4 as learning data.

Alternatively, the learning data selection unit 1010-3 may selectively select learning data required for learning from the preprocessed data. The selected learning data may be provided to the model learning unit 1010-4. The learning data selection unit 1010-3 may select learning data necessary for learning from the preprocessed data in accordance with a predetermined selection criterion. Further, the learning data selection unit 1010-3 may select learning data necessary for learning according to a predetermined selection criterion by learning by the model learning unit 1010-4. In one exemplary embodiment of the present disclosure, the learning data selection unit 1010-3 may select only the voice data that has been uttered by a specific user among the inputted voice data, and may select only the region including the person excluding the background among the image data.

The data learning unit 1010 may further include the model evaluation unit 1010-5 to improve a recognition result of the data recognition model.

The model evaluation unit 1010-5 inputs evaluation data to the data recognition model. When a recognition result output from the evaluation data does not satisfy a predetermined criterion, the model evaluating unit 1010-5 may instruct the model learning unit 1010-4 to learn again. The evaluation data may be predefined data for evaluating the data recognition model.

In an exemplary embodiment, when the number or the ratio of the evaluation data of the recognition results from the learned data recognition model exceeds a predetermined threshold value, the model evaluation unit 1010-5 may evaluate that a predetermined criterion is not satisfied. For example, in the case where a predetermined criterion is defined as a ratio of 2%, when the learned data recognition model outputs an incorrect recognition result for evaluation data exceeding 20 out of a total of 1000 evaluation data, the model evaluation unit 1010-5 may evaluate that the learned data recognition model is not suitable.

In another exemplary embodiment, when there are a plurality of learned data recognition models, the model evaluation unit 1010-5 may evaluate whether each of the learned data recognition models satisfies a predetermined criterion, and determine a model satisfying the predetermined criterion as a final data recognition model. In an exemplary embodiment, when there are a plurality of models satisfying a predetermined criterion, the model evaluation unit 1010-5 may determine any one or a predetermined number of models previously set in descending order of an evaluation score as a final data recognition model.

In another exemplary embodiment, at least one of the data acquisition unit 1010-1, the preprocessing unit 1010-2, the learning data selecting unit 1010-3, the model learning unit 1010-4, and the model evaluation unit 1010-5 may be implemented as a software module, fabricated in at least one hardware chip form and mounted on an electronic device. For example, at least one of the data acquisition unit 1010-1, the preprocessing unit 1010-2, the learning data selecting unit 1010-3, the model learning unit 1010-4, and the model evaluation unit 1010-5 may be made in the form of an exclusive hardware chip for artificial intelligence (AI), or may be fabricated as part of a conventional general-purpose processor (e.g., a CPU or application processor) or a graphics-only processor (e.g., a GPU), and may be mounted on various electronic devices.

The data acquisition unit 1010-1, the preprocessing unit 1010-2, the learning data selecting unit 1010-3, the model learning unit 1010-4, and the model evaluation unit 1010-5 may be mounted on one electronic device, or may be mounted on separate electronic devices, respectively. For example, some of the data acquisition unit 1010-1, the preprocessing unit 1010-2, the learning data selecting unit 1010-3, the model learning unit 1010-4, and the model evaluation unit 1010-5 may be included in an electronic device, and the rest may be included in a server.

At least one of the data acquisition unit 1010-1, the preprocessing unit 1010-2, the learning data selecting unit 1010-3, the model learning unit 1010-4, and the model evaluation unit 1010-5 may be realized as a software module. At least one of the data acquisition unit 1010-1, the preprocessing unit 1010-2, the learning data selecting unit 1010-3, the model learning unit 1010-4, and the model evaluation unit 1010-5 (or a program module including an instruction), the software module may be stored in a non-transitory computer readable media. At least one software module may be provided by an operating system (OS) or by a predetermined application. Alternatively, part of at least one of the at least one software module may be provided by an operating system (OS), and some of the at least one software module may be provided by a predetermined application.

Figure 12:
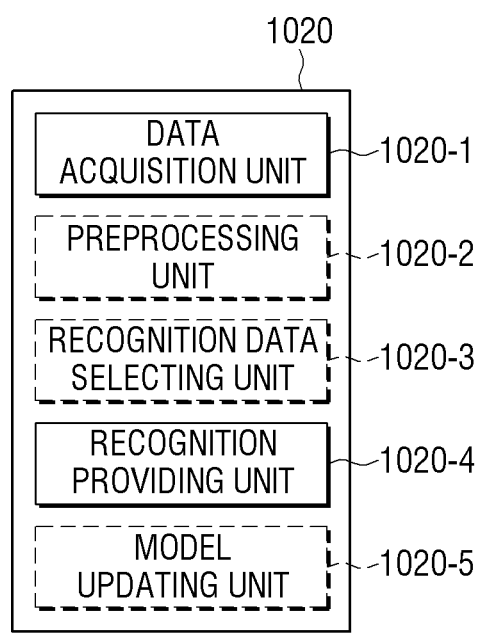

FIG. 12 is a block diagram of a data recognition unit 1020 according to some exemplary embodiments.

Referring to FIG. 12, the data recognition unit 1020 according to some exemplary embodiments may include a data acquisition unit 1020-1 and a recognition result providing unit 1020-4. The data recognition unit 1020 may further include at least one of the preprocessing unit 1020-2, the recognition data selecting unit 1020-3, and the model updating unit 1020-5 selectively.

The data acquisition unit 1020-1 may acquire recognition data which is required for determination of a situation.

The recognition result providing unit 1020-4 can determine the situation by applying the data obtained by the data acquisition unit 1020-1 to the learned data recognition model as an input value. The recognition result providing unit 1020-4 may provide the recognition result according to the data recognition purpose. Alternatively, the recognition result providing unit 1020-4 may provide the recognition result obtained by applying the preprocessed data from the preprocessing unit 1020-2 to the learned data recognition model as an input value. Alternatively, the recognition result providing unit 1020-4 may apply the data selected by the recognition data selecting unit 1020-3, which will be described later, to the data recognition model as an input value to provide the recognition result.

The data recognition unit 1210 may further include the preprocessing unit 1020-2 and the recognition data selection unit 1020-3 to improve a recognition result of the data recognition model or save resource or time for providing the recognition result.

The preprocessing unit 1020-2 may preprocess data acquired by the data acquisition unit 1020-1 to be used for recognition to determine a situation.

The preprocessing unit 1020-2 may process the acquired data into a predefined format so that the recognition result providing unit 1020-4 may easily use the data for determination of the situation. Particularly, according to one embodiment of the present disclosure, the data acquisition unit 1020-1 may acquire voice data and image data for determination of a situation (determination of a condition, action, event according to a condition, a function according to an action, detection resource for detecting an event, etc.) and the preprocessing unit 1020-2 may preprocess with the predetermined format as described above.

The recognition data selection unit 1020-3 may select recognition data required for situation determination from the preprocessed data. The selected recognition data may be provided to the recognition result providing unit 1020-4. The recognition data selection unit 1020-3 may select the recognition data necessary for the situation determination among the preprocessed data according to a predetermined selection criterion. The recognition data selection unit 1020-3 may also select data according to a predetermined selection criterion by learning by the model learning unit 1010-4 as described above.

The model updating unit 1020-5 may update a data recognition model based on an evaluation of a recognition result provided by the recognition result providing unit 1020-4. For example, the model updating unit 1020-5 may provide a recognition result provided by the recognition result providing unit 1020-4 to the model learning unit 1010-4, enabling the model learning unit 1010-4 to update a data recognition model.

At least one of the data acquisition unit 1020-1, the preprocessing unit 1020-2, the recognition data selecting unit 1020-3, the recognition result providing unit 1020-4, and the model updating unit 1020-5 in the data recognition unit 1020 may be implemented as a software module fabricated in at least one hardware chip form and mounted on an electronic device. For example, at least one among the data acquisition unit 1020-1, the preprocessing unit 1020-2, the recognition data selecting unit 1020-3, the recognition result providing unit 1020-4, and the model updating unit 1020-5 may be made in the form of an exclusive hardware chip for artificial intelligence (AI) or as part of a conventional general purpose processor (e.g., CPU or application processor) or a graphics only processor (e.g., GPU), and may be mounted on a variety of electronic devices.

The data acquisition unit 1020-1, the preprocessing unit 1020-2, the recognition data selecting unit 1020-3, the recognition result providing unit 1020-4, and the model updating unit 1020-5 may be mounted on an electronic device, or may be mounted on separate electronic devices, respectively. For example, some of the data acquisition unit 1020-1, the preprocessing unit 1020-2, the recognition data selecting unit 1020-3, the recognition result providing unit 1020-4, and the model updating unit 1020-5 may be included in an electronic device, and some may be included in a server.

At least one of the data acquisition unit 1020-1, the preprocessing unit 1020-2, the recognition data selecting unit 1020-3, the recognition result providing unit 1020-4, and the model updating unit 1020-5 may be implemented as a software module. At least one of the data acquisition unit 1020-1, the preprocessing unit 1020-2, the recognition data selecting unit 1020-3, the recognition result providing unit 1020-4, and the model updating unit 1020-5 (or a program module including an instruction), the software module may be stored in a non-transitory computer readable media. In an exemplary embodiment, at least one software module may be provided by an operating system (OS) or by a predetermined application. Alternatively, part of at least one of the at least one software module may be provided by an operating system (OS), and some of the at least one software module may be provided by a predetermined application.

Figure 13:
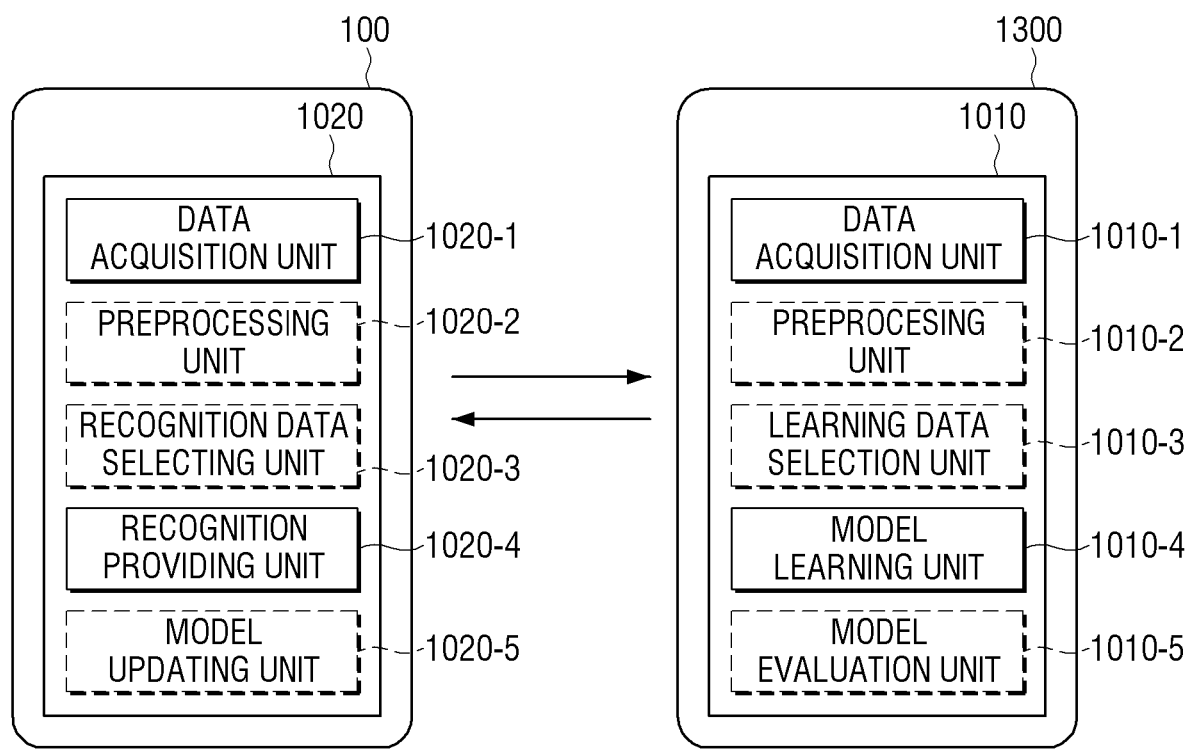

FIG. 13 is a diagram showing an example of learning and recognizing data by interlocking with the electronic device 100 and a server 1300 according to some exemplary embodiments.

The server 1300 may learn a criterion for determining a situation. The electronic device 100 may determine a situation based on a learning result by the server 1300.

In an exemplary embodiment. The model learning unit 1010-4 of the server 1300 may learn what data to use to determine a predetermined situation and a criterion on how to determine the situation using data. The model learning unit 1010-4 may acquire data to be used for learning, and apply the acquired data to a data recognition model, so as to learn a criterion for the situation determination.

The recognition result providing unit 1020-4 of the electronic device 100 may apply data selected by the recognition data selecting unit 1020-3 to a data recognition model generated by the server 1300 to determine a situation. The recognition result providing unit 1020-4 may transmit data selected by the recognition data selecting unit 1020-3 to the server 1300, and may request that the server 1300 applies the data selected by the recognition data selecting unit 1020-3 to a recognition model and determines a situation. In an exemplary embodiment, the recognition result providing unit 1020-4 may receive from the server 1300 information on a situation determined by the server 1300. For example, when voice data and image data are transmitted from the recognition data selecting unit 1020-3 to the server 1300, the server 1300 may apply the voice data and the image data to a pre-stored data recognition model to transmit information on a situation (e.g., condition and action, event according to condition, function according to action) to the electronic device 100.

Figure 14A:
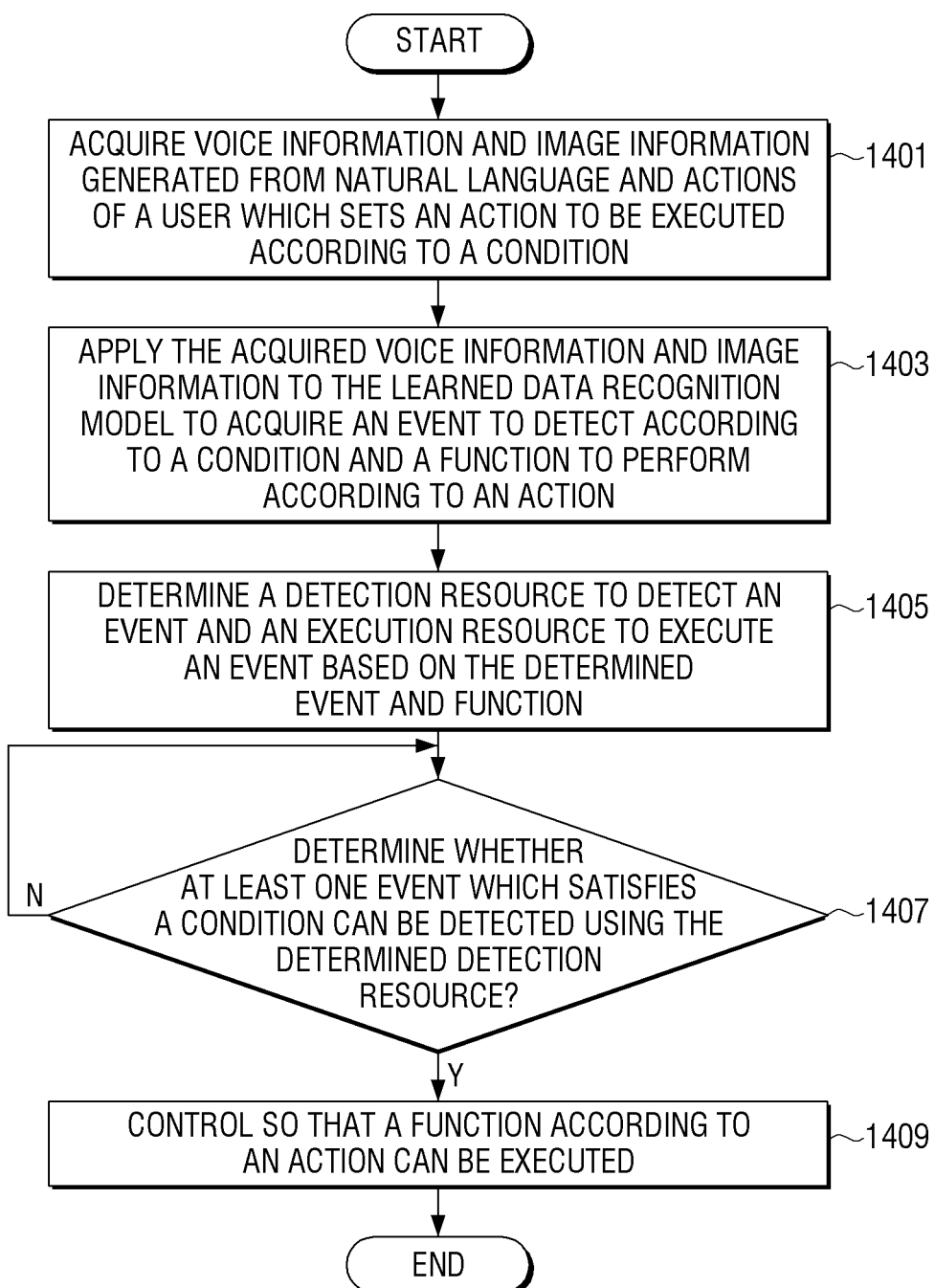
FIGS. 14A to 14C are flowcharts showing an electronic device using a data recognition model, according to an exemplary embodiment of the present disclosure.
Figure 14B:
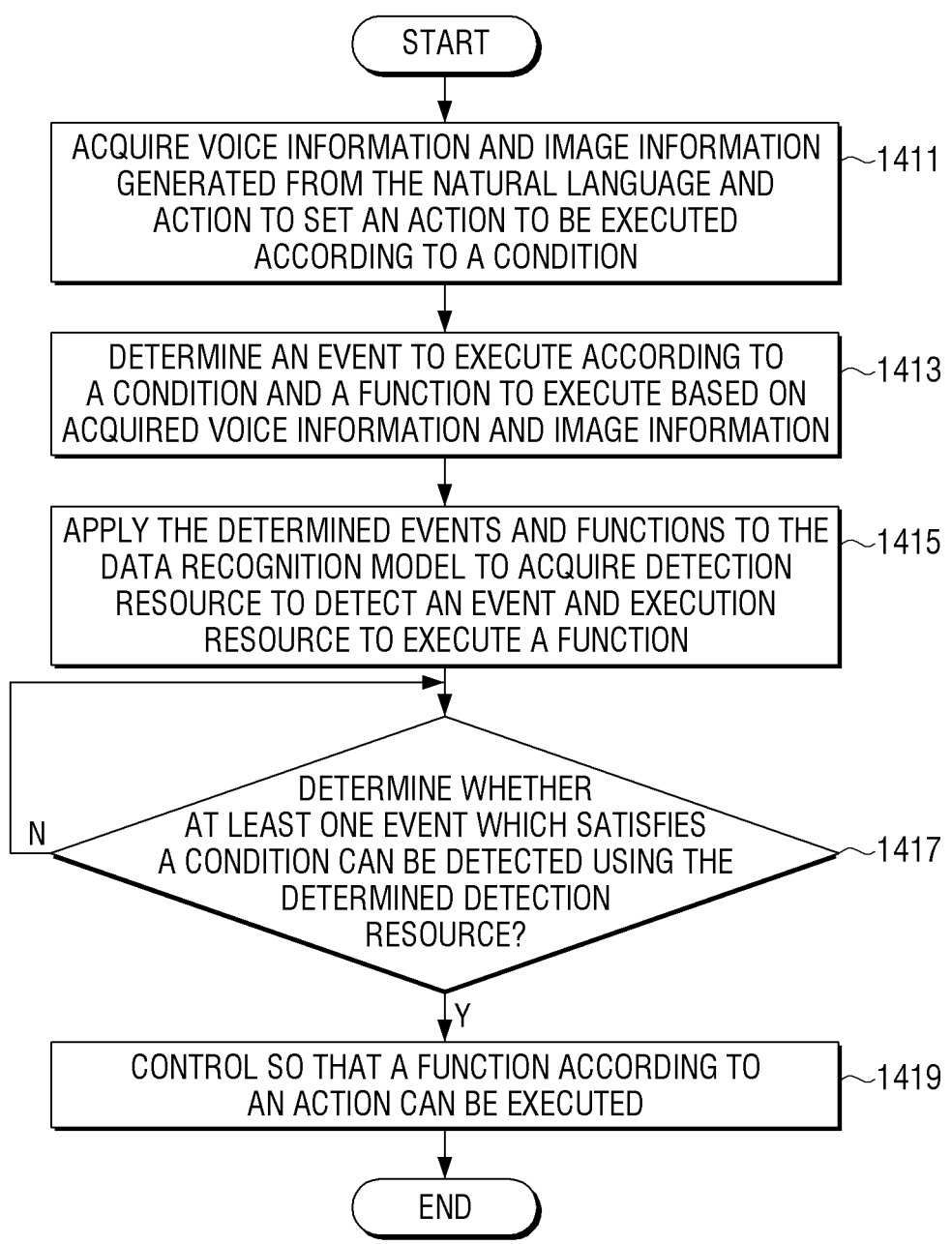
Figure 14C:
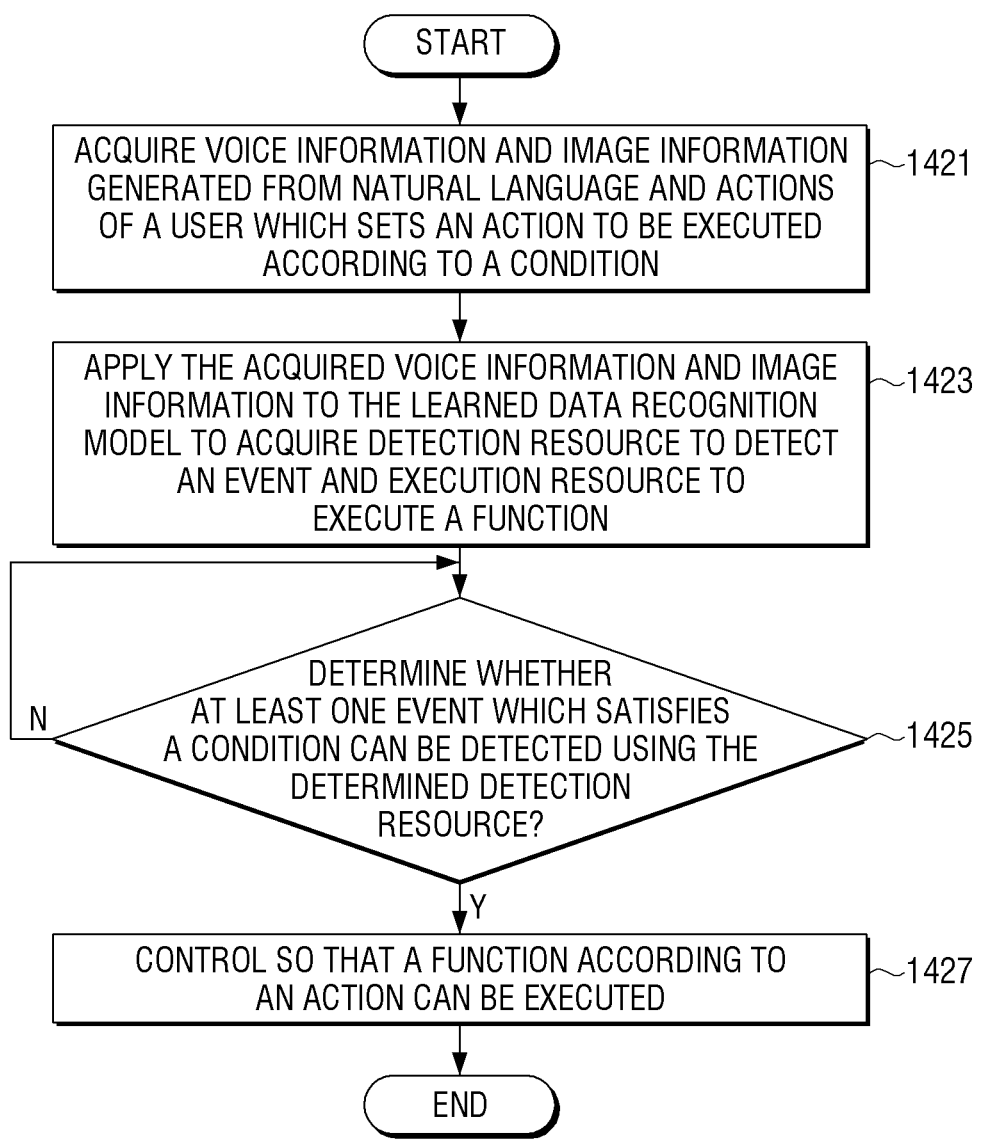

FIGS. 14A to 14C are flowcharts of the electronic device 100 which uses the data recognition model according to an exemplary embodiment.

In operation 1401 of FIG. 14A, the electronic device 100 may acquire voice information and image information generated from a natural language and actions of a user which sets an action to be executed according to a condition.

In operation 1403, the electronic device 100 may apply the acquired voice information and image information to the learned data recognition model to acquire an event to detect according to a condition and a function to perform according to an action. For example, in the example shown in FIG. 3A, when the user 1 performs a gesture indicating a drawer with his/her finger while speaking a natural language saying "record an image when another person opens the drawer over there," the electronic device 100 may acquire voice information generated according to the natural language and acquire image information generated according to the action. In addition, the electronic device 100 may apply the audio information and the image information to the learned data recognition model as the recognition data, determine "an event to open the drawer 330 and an event to recognize another user" as an event to be detected according to a condition and determine a "function of recording a situation to open the drawer 330 by another user as a video" as a function to perform according to an action.

In operation 1405, the electronic device 100 may determine a detection resource to detect an event and an execution resource to execute an event based on the determined event and function.

While the detection resource and execution resource are determined, in operation 1407, the electronic device 100 may determine whether at least one event which satisfies a condition can be detected using the determined detection resource.

At least one event is detected 1407-Y, the electronic device 100 may control so that a function according to an action can be executed.

As another exemplary embodiment, in operation 1411 of FIG. 14B, the electronic device 100 may acquire voice information and image information generated from the natural language and action to set an action to be executed according to a condition.

In operation 1413, the electronic device 100 may determine an event to detect according to a condition and a function to execute according to an action may be determined based on the acquired voice information and image information.

Next, in operation 1415, the electronic device 100 may apply the determined events and functions to the data recognition model to acquire detection resource to detect an event and execution resource to execute a function. For example, in the example shown in FIG. 3A, if the determined event and functions are each an event in which "the drawer 330 is opened and another person is recognized", and the function to be executed according to the action is "a function to record a situation in which another user opens the drawer 330 as a video", the electronic device 100 can apply the determined event and function to the data recognition model as recognition data. As a result of applying the data recognition model, the electronic device 100 may determine a distance detection sensor that detects an open event of the drawer 330 as a detection resource and a fingerprint recognition sensor or an iris recognition sensor that detects an event that recognizes another person, and determine a camera located around the drawer 330 as an execution resource.

In operations 1417 to 1419, when at least one event to satisfy a condition is detected, the electronic device 100 may control so that a function according to an action is executed.

As still another exemplary embodiment, in operation 1421 of FIG. 14C, the electronic device 100 may acquire voice information and image information which are generated from a natural language and an action to set an action to be executed according to a condition.

In operation 1423, the electronic device 100 may apply the acquired voice information and image information to the data recognition model to determine the detection resources to detect the event and the execution resources to execute the function. For example, in the example shown in FIG. 3A, if the acquired voice information is "Record an image when another person opens a drawer over there" and the image information includes a gesture indicating a drawer with a finger, the electronic device 100 may apply the acquired voice information and image information to the data recognition model as recognition data. The electronic device 100 may then detect an open event of the drawer 330 as a result of applying the data recognition model, and determine the camera located around the drawer 330 as an execution resource.

In operations 1425 to 1427, the electronic device 100, when at least one event which satisfies a condition is detected, may control so that a function according to an action is executed.

Figure 15A:
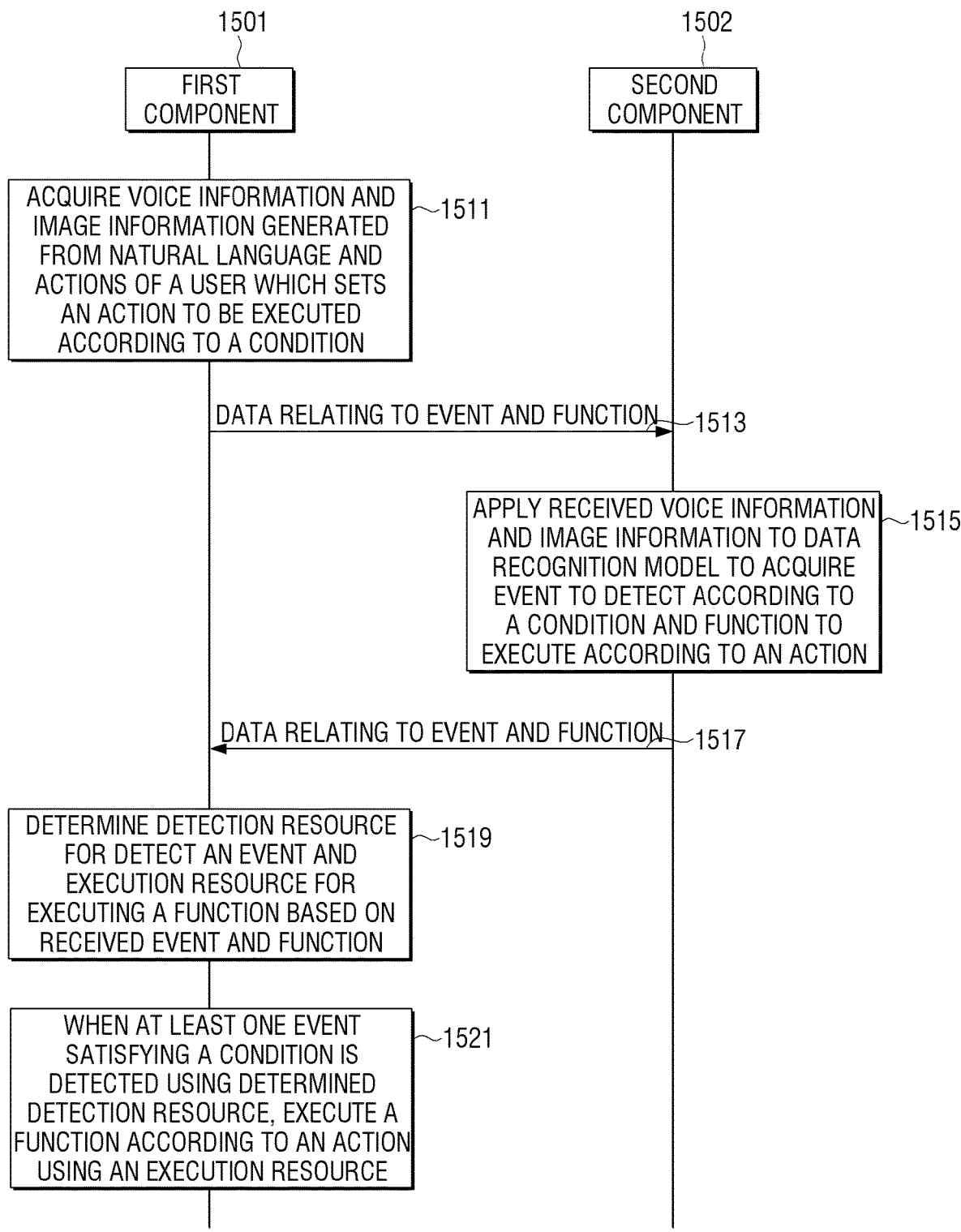
FIGS. 15A to 15C are flowcharts of a network system using a data recognition model, according to an exemplary embodiment of the present disclosure.
Figure 15B:
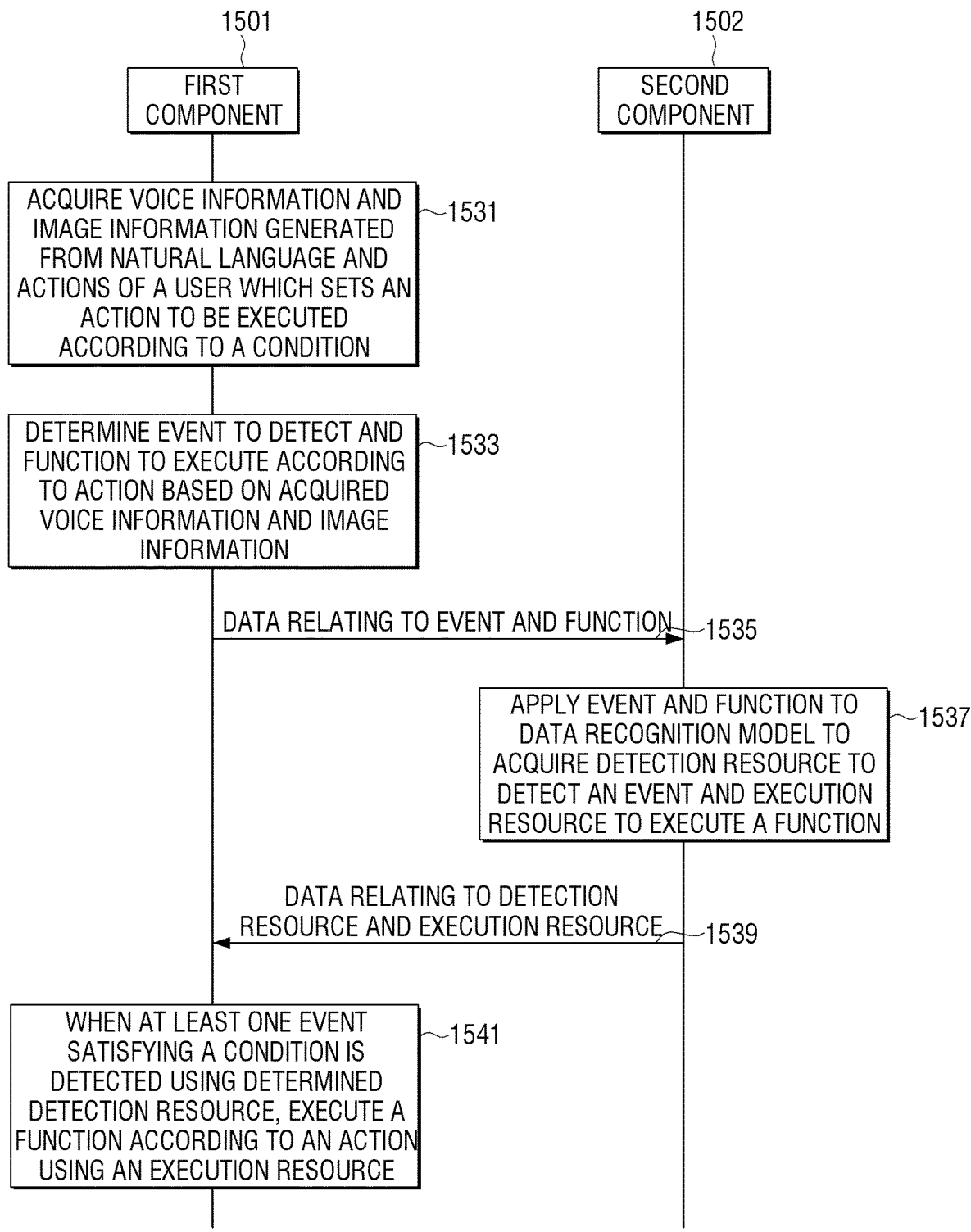
Figure 15C:
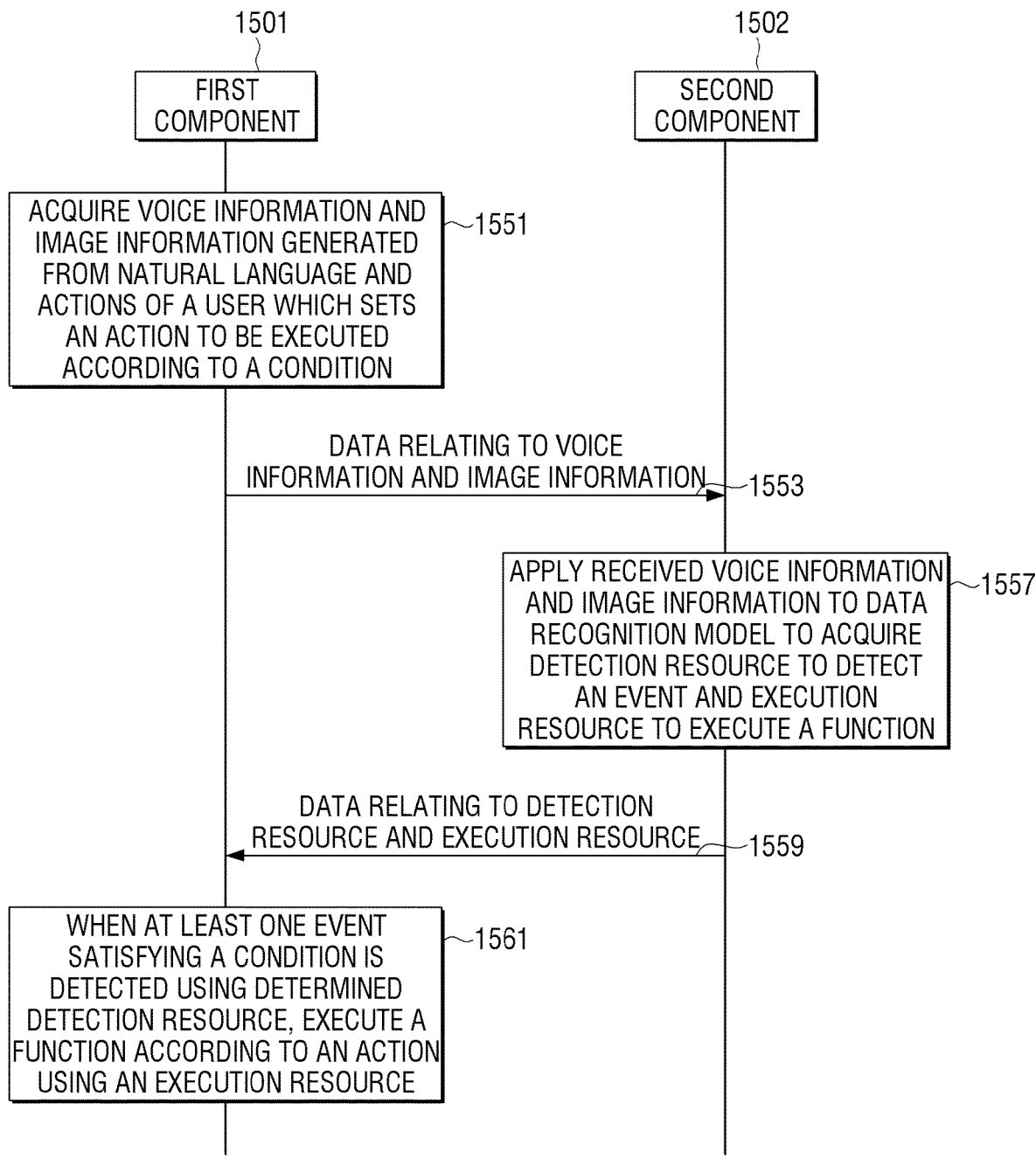

FIGS. 15A to 15C are flowcharts of network system which uses a data recognition model according to an exemplary embodiment.

In FIGS. 15A to 15C, the network system which uses the data recognition model may include a first component 1501 and a second component 1502.

As one example, the first component 1501 may be the electronic device 100 and the second component 1502 may be the server 1300 that stores the data recognition model. Alternatively, the first component 1501 may be a general purpose processor and the second component 1502 may be an artificial intelligence dedicated processor. Alternatively, the first component 1501 may be at least one application, and the second component 1502 may be an operating system (OS). That is, the second component 1502 may be more integrated than the first component 1501, dedicated, less delayed, perform better, or have more resources than the first component 1501. The second component 1502 may be a component that can process many operations required at the time of generation, update, or application more quickly and efficiently than the first component 1501.

In this case, interface to transmit/receive data between the first component 1501 and the second component 1502 may be defined.

For example, an application program interface (API) having an argument value (or an intermediate value or a transfer value) of learning data to be applied to the data recognition model may be defined. The API can be defined as a set of subroutines or functions that can be called for any processing of any protocol (e.g., a protocol defined in the electronic device 100) to another protocol (e.g., a protocol defined in the server 1300). That is, an environment can be provided in which an operation of another protocol can be performed in any one protocol through the API.

As an exemplary embodiment, in operation 1511 of FIG. 15A, the first component 1501 may acquire voice information and image information generated from the natural language and action to set an action to be executed according to a condition.

In operation 1513, the first component 1501 may transmit data (or a message) regarding the acquired voice information and image information to the second component 1502. For example, when the first component 1501 calls the API function and inputs voice information and image information as data argument values, the API function may transmit the voice information and image information to the second component 1502 as the recognition data to be applied to the data recognition model.

In operation 1515, the second component 1502 may acquire an event to detect according to a condition and a function to execute according to an action by applying the received voice information and image information to the data recognition model.

In operation 1517, the second component 1502 may transmit data (or message) regarding the acquired event and function to the first component 1501.

In operation 1519, the first component 1501 may determine a detection resource to detect an event and an execution resource to execute a function based on the received event and function.

In operation 1521, the first component 1501, when at least one event is detected which satisfies a condition using the determined detection resource, may execute a function according to an action using the determined execution resource.

As another exemplary embodiment, in operation 1531 of FIG. 15B, the first component 1501 may acquire voice information and image information generated from the natural language and action to set an action to be executed according to a condition.

In operation 1533, the first component 1501 may determine a detection resource to detect an event and an execution resource to execute a function based on the acquired voice information and image information.

In operation 1535, the first component 1501 may transmit data (or a message) regarding the acquired voice information and image information to the second component 1502. For example, when the first component 1501 calls the API function and inputs event and function as data argument values, the API function may transmit the event and function to the second component 1502 as the recognition data to be applied to the data recognition model.

In operation 1537, the second component 1502 may acquire an event to detect according to a condition and a function to execute according to an action by applying the received event and function to the data recognition model.

In operation 1539, the second component 1502 may transmit data (or message) regarding the acquired detection resource and execution resource to the first component 1501.

In operation 1541, the first component 1501, when at least one event which satisfies a condition is detected using the received detection resources, may execution a function according to an action using the received execution resource.

As another exemplary embodiment, in operation 1551 of FIG. 15C, the first component 1501 may acquire voice information and image information generated from the natural language and action to set an action to be executed according to a condition.

In operation 1553, the first component 1501 may transmit data (or a message) regarding the acquired voice information and image information to the second component 1502. For example, when the first component 1501 calls the API function and inputs voice information and image information as data argument values, the API function may transmit the image information and voice information to the second component 1502 as the recognition data to be applied to the data recognition model.

In operation 1557, the second component 1502 may acquire an event to detect according to a condition and a function to execute according to an action by applying the received voice information and image information to the data recognition model.

In operation 1559, the second component 1502 may transmit data (or message) regarding the acquired detection resource and execution resource to the first component 1501.

In operation 1561, the first component 1501 may execute a function according to an action using the received execution resource, if at least one event which satisfies a condition is detected using the received detection resource.

In another exemplary embodiment, the recognition result providing unit 1020-4 of the electronic device 100 may receive a recognition model generated by the server 1300, and may determine a situation using the received recognition model. The recognition result providing unit 1020-4 of the electronic device 100 may apply data selected by the recognition data selecting unit 1020-3 to a data recognition model received from the server 1300 to determine a situation. For example, the electronic device 100 may receive a data recognition model from the server 1300 and store the data recognition model, and may apply voice data and image data selected by the recognition data selecting unit 1020-3 to the data recognition model received from the server 1300 to determine information (e.g., condition and action, event according to condition, function according to action, etc.) on a situation.

The present disclosure is not limited to these exemplary embodiments, as all the elements constituting the exemplary embodiments of the present disclosure are described as being combined or operated in one operation. Within the scope of the present disclosure, all of the elements may be selectively coupled to one or more of them. Although all of the components may be implemented as one independent hardware, some or all of the components may be selectively combined and implemented as a computer program having a program module to perform a part or all of the functions in one or a plurality of hardware.

At least a portion of a device (e.g., modules or functions thereof) or method (e.g., operations) according to various exemplary embodiments may be embodied as a command stored in a non-transitory computer readable media) in the form of a program module. When a command is executed by a processor (e.g., processor 120), the processor may perform a function corresponding to the command.

In an exemplary embodiment, the program may be stored in a computer-readable non-transitory recording medium and read and executed by a computer, thereby realizing the exemplary embodiments of the present disclosure.

In an exemplary embodiment, the non-transitory readable recording medium refers to a medium that semi-permanently stores data and is capable of being read by a device, and includes a register, a cache, a buffer, and the like, but does not include transmission media such as a signal, a current, etc.

In an exemplary embodiment, the above-described programs may be stored in non-transitory readable recording media such as CD, DVD, hard disk, Blu-ray disc, USB, internal memory (e.g., memory 110), memory card, ROM, RAM, and the like.

In addition, a method according to exemplary embodiments may be provided as a computer program product.

A computer program product may include an S/W program, a computer-readable storage medium which stores the S/W program therein, or a product which is traded between a seller and a purchaser.

For example, a computer program product may include an S/W program product (e.g., a downloadable APP) which is electronically distributed through an electronic device, a manufacturer of the electronic device, or an electronic market (e.g., Google Play Store, App Store). For electronic distribution, at least a portion of the software program may be stored on a storage medium or may be created temporarily. In this case, the storage medium may be a storage medium of a server of a manufacturer or an electronic market, or a relay server.

While the present disclosure has been shown and described with reference to various exemplary embodiments thereof, it will be understood by one of ordinary skill in the art that various changes in form and details may be made therein without departing from the spirit and scope of the present disclosure as defined by the appended claims and their equivalents.

What is claimed is:

1. A controlling method of an electronic device, the method comprising:
   acquiring voice information and image information setting a condition and an action to be executed according to the condition, the voice information and the image information being generated from a voice and a behavior;
   determining an event that is to be detected according to the condition and a function to be executed according to the action, based on the voice information and the image information, and storing the event and the function;
   determining at least one detection resource to detect the event; and
   in response to the at least one detection resource detecting the event satisfying the condition, executing the function according to the action.

2. The method of claim 1, wherein the determining the at least one detection resource comprises:
   retrieving pre-installed available resources; and
   determining at least one detection resource, among the retrieved pre-installed available resources, to detect the event using a detection function of the at least one detection resource.

3. The method of claim 1, wherein the at least one detection resource is a module included in the electronic device or an external device positioned outside the electronic device.

4. The method of claim 1, further comprising:
   in response to the at least one detection resource being determined, transmitting control information requesting detection of the event to the at least one determined detection resource.

5. The method of claim 1, further comprising:
   retrieving pre-installed available resources; and
   determining at least one execution resource, among the retrieved pre-installed available resources, to execute the function according to the action using an execution function of the determined at least one execution resource.

6. The method of claim 5, wherein the executing the function according to the action comprises transmitting control information to the determined at least one execution resource for the determined at least one execution resource to execute the function according to the action.

7. The method of claim 1, wherein the executing the function according to the action comprises:
   receiving a result of detection of the event from the detection resource; and
   executing the function according the action based on the received detection result.

8. The method of claim 1, further comprising providing, in response to there being no detection resource to detect the event or in response to the detection resource not being capable of detecting the event, a notification user interface (UI) notifying that execution of the action according to the condition is not possible.

9. The method of claim 1, wherein the determining the event to be detected comprises determining the condition and the action according to an intent of a user by applying the voice information and image information to a data recognition model generated using a learning algorithm.

10. The method of claim 9, wherein the determining the condition and the action according to the intent of the user further comprises:
    providing a notification user interface (UI) for identifying the condition and the action to the user.

11. An electronic device, comprising:
    a memory; and
    a processor configured:
    to acquire voice information and image information setting a condition and an action to be executed according to the condition, the voice information and the image information being generated from a voice and a behavior,
    to determine an event that is to be detected according to the condition and a function to be executed according to the action, based on the voice information and the image information, and to store the event and the function,
    to determine at least one detection resource to detect the event, and
    to execute, in response to the at least one determined detection resource detecting the event satisfying the condition, the function according to the action.

12. The electronic device of claim 11, wherein the processor is further configured:
    to retrieve, in response to determining the at least one detection resource, pre-installed available resources, and
    to determine at least one detection resource, among the retrieved pre-installed available resources, to detect the event using a detection function of the at least one detection resource.

13. The electronic device of claim 11, wherein the at least one detection resource is a module included in the electronic device and an external device located outside the electronic device.

14. The device of claim 11, wherein the electronic device further comprises a communicator configured to communicate with the at least one detection resource, and
    wherein the processor is further configured to control, in response to the at least one detection resource being determined, the communicator to transmit control information requesting for detection of the event to the at least one determined detection resource.

15. The device of claim 11, wherein the processor is further configured:
    to retrieve pre-installed available resources, and
    to determine at least one execution resource, among the retrieved pre-installed available resources, to execute the function according to the action using an execution function of the determined at least one execution resource.

16. The device of claim 15, wherein the electronic device further comprises a communicator configured to communicate with the execution resource, and
    wherein the processor is further configured to transmit, in response to executing the function according to the action, control information to the determined at least one execution resource for the determined at least one execution resource to execute the function according to the action.

17. The device of claim 11, wherein the processor is further configured:
   to receive, in response to executing the function according to the action, a result of detection of the event from the detection resource, and
   to execute the function according to the action based on the received detection result.

18. The device of claim 11, wherein the electronic device further comprises a display configured to display a user interface (UI), and
   wherein the processor is further configured to control, in response to there being no detection resource to detect the event or in response to the detection resource not being capable of detecting the event, the display to display a notification UI informing that execution of the action according to the action is not possible.

19. The device of claim 11, wherein the processor is further configured to:
   determine, in response to determining a function to be executed according to an event to be detected and the action according to the condition based on the voice information and the image information, the condition and action according to an intent of a user by applying the voice information and the image information to a data recognition model generated using a learning algorithm, and
   determine an event to be detected according to the condition and a function to be executed according to the action.

20. The device of claim 19, wherein the electronic device further comprises a display configured to display a user interface (UI), and
   wherein the processor is further configured to control, in response to determining the condition and the action according to the intent of the user, the display to display a notification UI for identifying the condition and the action to the user.

* * * * *